(12) United States Patent
Aiba et al.

(10) Patent No.: US 10,743,335 B2
(45) Date of Patent: *Aug. 11, 2020

(54) TERMINAL DEVICE, BASE STATION DEVICE, COMMUNICATION METHOD, AND INTEGRATED CIRCUIT

(71) Applicant: Sharp Kabushiki Kaisha, Sakai, Osaka (JP)

(72) Inventors: Tatsushi Aiba, Sakai (JP); Shoichi Suzuki, Sakai (JP); Kazunari Yokomakura, Sakai (JP); Hiroki Takahashi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/567,983

(22) PCT Filed: Apr. 25, 2016

(86) PCT No.: PCT/JP2016/062923
§ 371 (c)(1),
(2) Date: Oct. 20, 2017

(87) PCT Pub. No.: WO2016/175172
PCT Pub. Date: Nov. 3, 2016

(65) Prior Publication Data
US 2018/0115986 A1    Apr. 26, 2018

(30) Foreign Application Priority Data

Apr. 28, 2015  (JP) .................................. 2015-090911

(51) Int. Cl.
*H04W 72/04* (2009.01)
*H04W 72/12* (2009.01)
(Continued)

(52) U.S. Cl.
CPC ......... *H04W 72/1278* (2013.01); *H04J 11/00* (2013.01); *H04L 1/1812* (2013.01);
(Continued)

(58) Field of Classification Search
None
See application file for complete search history.

(56) References Cited

U.S. PATENT DOCUMENTS 10,555,283 B2 * 2/2020 Aiba ..................... H04L 5/0053
2007/0218369 A1 * 9/2007 Kaiduka ................ H01M 2/16
429/246
(Continued)

FOREIGN PATENT DOCUMENTS

EP          2 760 171 A2      7/2014
WO      WO 2016/154840   * 10/2016

OTHER PUBLICATIONS

Official Communication issued in International Patent Application No. PCT/JP2016/062923, dated Jul. 19, 2016.
(Continued)

*Primary Examiner* — Christopher T Wyllie
(74) *Attorney, Agent, or Firm* — Keating & Bennett, LLP

(57) ABSTRACT

Aspects of the disclosure relate to a terminal device including a transmission unit configured to transmit a HARQ-ACK using a first PUCCH resource and a PUCCH format (3) with respect to PDSCH transmission on a secondary cell having a cell index less than or equal to a first predetermined value, and transmit a HARQ-ACK by using a second PUCCH resource and a PUCCH format (4) with respect to PDSCH transmission on a secondary cell having a cell index greater than the first predetermined value. The first predetermined value may be the value of a fourth cell index when arranging the values of the cell indices set by a base station device in ascending order.

8 Claims, 11 Drawing Sheets

(51) Int. Cl.

| | | |
|---|---|---|
| *H04J 11/00* | (2006.01) | |
| *H04W 28/04* | (2009.01) | |
| *H04L 5/00* | (2006.01) | |
| *H04L 1/18* | (2006.01) | |
| *H04L 5/14* | (2006.01) | |
| *H04W 88/02* | (2009.01) | |
| *H04W 88/08* | (2009.01) | |

(52) U.S. Cl.
CPC .......... *H04L 1/1861* (2013.01); *H04L 5/0055* (2013.01); *H04W 28/04* (2013.01); *H04W 72/04* (2013.01); *H04L 5/14* (2013.01); *H04W 88/02* (2013.01); *H04W 88/08* (2013.01)

(56) References Cited

U.S. PATENT DOCUMENTS

| | | | | |
|---|---|---|---|---|
| 2012/0082157 | A1* | 4/2012 | Yamada | H04L 1/1671 370/389 |
| 2012/0194338 | A1* | 8/2012 | Snodgrass | G08B 21/245 340/539.12 |
| 2012/0307760 | A1* | 12/2012 | Han | H04L 5/0055 370/329 |
| 2013/0114472 | A1* | 5/2013 | Tamaki | H04L 5/001 370/280 |
| 2013/0194931 | A1* | 8/2013 | Lee | H04L 5/0053 370/241 |
| 2014/0092865 | A1* | 4/2014 | Heo | H04L 5/0055 370/331 |
| 2014/0233481 | A1* | 8/2014 | Feng | H04L 5/0055 370/329 |
| 2014/0328304 | A1* | 11/2014 | Suzuki | H04W 72/1257 370/329 |
| 2014/0328333 | A1 | 11/2014 | Seo et al. | |
| 2014/0362797 | A1* | 12/2014 | Aiba | H04L 1/1861 370/329 |
| 2015/0098424 | A1* | 4/2015 | Li | H04W 72/04 370/329 |
| 2015/0215079 | A1* | 7/2015 | Park | H04L 1/1854 370/280 |
| 2015/0223231 | A1* | 8/2015 | Noh | H04L 5/0048 370/329 |
| 2016/0044606 | A1* | 2/2016 | Yin | H04W 52/367 455/450 |
| 2016/0338048 | A1* | 11/2016 | Aiba | H04W 72/00 |
| 2016/0345199 | A1* | 11/2016 | Nogami | H04L 5/0007 |
| 2017/0019884 | A1* | 1/2017 | Yang | H04L 1/1812 |
| 2017/0374661 | A1* | 12/2017 | Aiba | H04W 24/10 |
| 2018/0007686 | A1* | 1/2018 | Lyu | H04L 5/0053 |
| 2018/0019853 | A1* | 1/2018 | Aiba | H04L 1/1812 |
| 2018/0027547 | A1* | 1/2018 | Lyu | H04L 1/16 370/329 |
| 2018/0115986 | A1* | 4/2018 | Aiba | H04L 5/0055 |
| 2018/0124751 | A1* | 5/2018 | Aiba | H04J 11/00 |
| 2019/0104509 | A1* | 4/2019 | Aiba | H04L 1/1812 |
| 2019/0280757 | A1* | 9/2019 | Yang | H04L 5/0048 |
| 2020/0128525 | A1* | 4/2020 | Aiba | H04W 74/0858 |

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP TS 36.211 V12.4.0, Dec. 2014, pp. 1-124.

"3rd Generation Partnership Project; Technical Specification Group Radio Access Network; Evolved Universal Terrestrial Radio Access (E-UTRA); Multiplexing and channel coding (Release 12)", 3GPP TS 36.212 V12.3.0, Dec. 2014, pp. 1-89.

"3rd Generation Partnership Project; Technical Specification Group Radio Access Network; Evolved Universal Terrestrial Radio Access (E-UTRA); Physical layer procedures (Release 12)", 3GPP TS 36.213 V12.4.0, Dec. 2014, pp. 1-225.

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.4.0, Dec. 2014, pp. 1-60.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.4.1, Dec. 2014, pp. 1-410.

Nokia Corporation et al., "New WI proposal: LTE Carrier Aggregation Enhancement Beyond 5 Carriers", 3GPP TSG RAN Meeting #66, RP-142286, Dec. 8-11, 2014, 9 pages.

CMCC, "Discussion on PUCCH design for CA enhancement", 3GPP TSG RAN WG1 Meeting #80bis, R1-152024, Apr. 20-24, 2015, 4 pages.

Alcatel-Lucent et al., "PUCCH design for A/N feedbacks on PCell up to 32 carrier aggregation", 3GPP TSG RAN WG2 Meeting #80bis, R1-151326, Apr. 20-24, 2015, 4 pages.

Ericsson, "PUCCH resource allocation for HARQ-ACK", 3GPP TSG RAN WG1 Meeting, R1-151801, Apr. 20-24, 2015, 3 pages.

Nokia Networks, "Dynamic adaptation of HARQ-ACK feedback size and PUCCH format", 3GPP TSG RAN WG1 Meeting #80bis, R1-151838, Apr. 20-24, 2015, 3 pages.

Aiba, T. et al.; "Terminal Device, Base Station Device, Communication Method, and Integrated Circuit"; U.S. Appl. No. 15/567,982, filed Oct. 20, 2017.

* cited by examiner

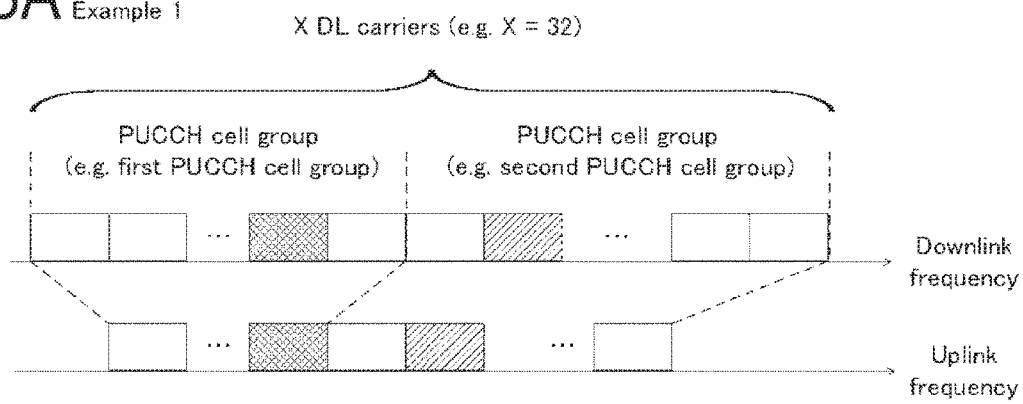
FIG. 3A Example 1
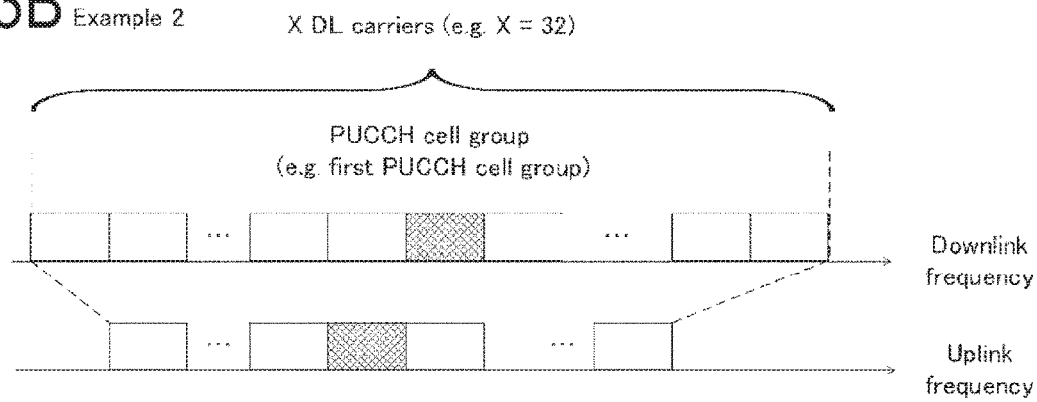
FIG. 3B Example 2
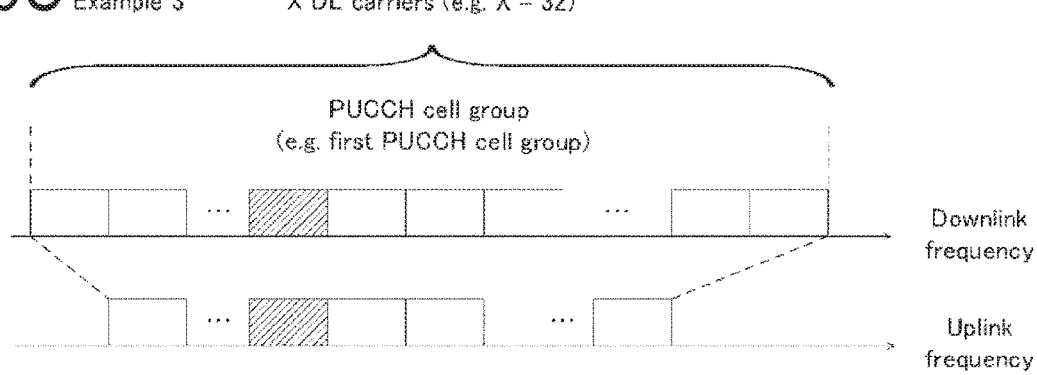
FIG. 3C Example 3

| Cell index | "0" | "1" | "3" | "4" | "6" | "10" | "12" | "15" | "31" |
|---|---|---|---|---|---|---|---|---|---|
| HARQ-ACK bit | 2 bits | 1 bits | 2 bits | 1 bit | 2bit | 1 bit | 2 bits | 1 bit | 1 bit |
| The result of concatenation of HARQ-ACK bits | 2 bits | 3 bits | 5 bits | 6 bits | 8 bits | 9 bits | 11 bits | 13 bits | 14 bits |

FIRST PREDETERMINED VALUE → "10"

SECOND PREDETERMINED VALUE → "12"

THIRD PREDETERMINED VALUE (e.g. 10 bits) ← 11 bits

FIG. 5

The sequence of bits $\tilde{o}_0^{ACK}, \tilde{o}_1^{ACK}, \ldots, \tilde{o}_{O^{ACK}-1}^{ACK}$ is the result of the concatenation of HARQ-ACK bits for different cells according to the following pseudo-code:

Set $c = 0$ -- cell index: lower indices correspond to lower RRC indices of corresponding cell Set $j = 0$ -- HARQ-ACK bit index Set $N_{cells}^{DL}$ to the number of cells configured by higher layers for the UE while $c < N_{cells}^{DL}$ if transmission mode configured in cell $c \in \{1,2,5,6,7\}$ -- 1 bit HARQ-ACK feedback for this cell $\tilde{o}_j^{ACK}$ = HARQ-ACK bit of this cell $j = j + 1$ else $\tilde{o}_j^{ACK}$ = HARQ-ACK bit corresponding to the first codeword of this cell $j = j + 1$ $\tilde{o}_j^{ACK}$ = HARQ-ACK bit corresponding to the second codeword of this cell $j = j + 1$ end if $c = c + 1$ end while

FIG. 6

The sequence of bits $\tilde{o}_0^{ACK}, \tilde{o}_1^{ACK}, \ldots, \tilde{o}_{o^{ACK}-1}^{ACK}$ is the result of the concatenation of HARQ-ACK bits for different cells according to the following pseudo-code:

Set $c = 0$ – cell index; lower indices correspond to lower RRC indices of corresponding cell Set $j = 0$ – HARQ-ACK bit index Set $N_{cells}^{DL}$ to the number of cells configured by higher layers for the UE Set X to min { $N_{cells}^{DL}$, a first value (e.g. 5 or 10)} while $c < X$ if transmission mode configured in cell $c \in \{1,2,5,6,7\}$ – 1 bit HARQ-ACK feedback for this cell $\tilde{o}_j^{ACK}$ = HARQ-ACK bit of this cell $j = j + 1$ else $\tilde{o}_j^{ACK}$ = HARQ-ACK bit corresponding to the first codeword of this cell $j = j + 1$ $\tilde{o}_j^{ACK}$ = HARQ-ACK bit corresponding to the second codeword of this cell $j = j + 1$ end if $c = c + 1$ end while

FIG. 7

The sequence of bits $\tilde{o}_0^{ACK}, \tilde{o}_1^{ACK}, \ldots, \tilde{o}_{o^{ACK}-1}^{ACK}$ is the result of the concatenation of HARQ-ACK bits for different cells according to the following pseudo-code:

Set $c = 0$ – cell index; lower indices correspond to lower RRC indices of corresponding cell Set $j = 0$ – HARQ-ACK bit index Set $N_{cells}^{DL}$ to the number of cells configured by higher layers for the UE Set Y to a second value (e.g. 10, or 20)

while $c < Y$ if transmission mode configured in cell $c \in \{1,2,5,6,7\}$ – 1 bit HARQ-ACK feedback for this cell $\tilde{o}_j^{ACK}$ = HARQ-ACK bit of this cell $j = j + 1$ else $\tilde{o}_j^{ACK}$ = HARQ-ACK bit corresponding to the first codeword of this cell $j = j + 1$ $\tilde{o}_j^{ACK}$ = HARQ-ACK bit corresponding to the second codeword of this cell $j = j + 1$ end if $c = c + 1$ end while

FIG. 8

TERMINAL DEVICE, BASE STATION DEVICE, COMMUNICATION METHOD, AND INTEGRATED CIRCUIT

This application claims priority based on JP 2015-090911 filed on Apr. 28, 2015, the contents of which are incorporated herein by reference.

TECHNICAL FIELD

The present invention relates to a terminal device, a base station device, a communication method, and an integrated circuit.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") have been considered (NPL 1, NPL 2, NPL 3, NPL 4, and NPL 5). In LTE, a base station device is also referred to as an evolved NodeB (eNodeB), and a terminal device is also referred to as user equipment (UE). LTE is a cellular communication system in which an area is divided into a plurality of cells to form a cellular pattern, each of the cells being served by a base station device. In such a cellular communication system, a single base station device may manage multiple cells.

LTE supports a time division duplex (TDD). LTE that employs a TDD scheme is also referred to as TD-LTE or LTE TDD. In TDD, uplink signals and downlink signals are time division multiplexed. Furthermore, LTE supports a frequency division duplex (FDD).

In 3GPP, career aggregation has been specified which allows a terminal device to perform simultaneous transmission and/or reception in up to five serving cells (component careers).

In addition, in 3GPP, a configuration where a terminal device performs simultaneous transmission and/or reception in more than five serving cells (component careers) has been considered (NPL 1). Furthermore, a configuration where a terminal device transmits a physical uplink control channel on a secondary cell which is a serving cell other than the primary cell has been considered (NPL 6).

CITATION LIST

Non Patent Literature

NPL 1: "3GPP TS 36.211 V12.4.0 (December 2014) Evolved Universal Terrestrial Radio Access (E-UTRA); Physical channels and modulation (Release 12)", 6 Jan. 2015.
NPL 2: "3GPP TS 36.212 V12.3.0 (December 2014) Evolved Universal Terrestrial Radio Access (E-UTRA); Multiplexing and channel coding (Release 12)", 6 Jan. 2015.
NPL 3: "3GPP TS 36.213 V12.4.0 (December 2014) Evolved Universal Terrestrial Radio Access (E-UTRA); Physical layer procedures (Release 12)", 7 Jan. 2015.
NPL 4: "3GPP TS 36.321 V12.4.0 (December 2014) Evolved Universal Terrestrial Radio Access (E-UTRA); Medium Access Control (MAC) protocol specification (Release 12)", 5 Jan. 2015.
NPL 5: "3GPP TS 36.331 V12.4.1 (December 2014) Evolved Universal Terrestrial Radio Access (E-UTRA); Radio Resource Control (RRC); Protocol specification (Release 12)", 7 Jan. 2015.
NPL 6: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8-11 Dec. 2014.

SUMMARY OF INVENTION

Technical Problem

However, for the radio communication system as described above, a concrete method when transmitting uplink control information has not been sufficiently discussed.

The present invention has been made in light of the foregoing, and an object of the present invention is to provide a terminal device, a base station device, a communication method, and an integrated circuit which enable efficient transmission of uplink control information.

Solution to Problem (1) In order to accomplish the above-described object, some aspects of the present invention are contrived to provide the following means. Aspects of the present invention relate to a terminal device including a transmission unit configured to transmit, with respect to PDSCH transmission on a secondary cell having a cell index less than or equal to a first predetermined value, a HARQ-ACK using a first PUCCH resource and a PUCCH format 3, and transmit, with respect to PDSCH transmission on a secondary cell on a secondary cell having a cell index greater than the first predetermined value, a HARQ-ACK using a second PUCCH resource and a PUCCH format 4. The first predetermined value may include a value of a fourth cell index when values of a set of cell indices set by a base station device are arranged in ascending order. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

(2) Aspects of the present invention relate to a terminal device including a transmission unit configured to transmit, with respect to PDSCH transmission on a secondary cell having a cell index less than or equal to a first predetermined value, a HARQ-ACK using a first PUCCH resource and a PUCCH format 3, and transmit, with respect to PDSCH transmission on a secondary cell having a cell index greater than the first predetermined value, a HARQ-ACK using a second PUCCH resource and a PUCCH format 4. The first predetermined value may be a maximum cell index value with a bit sequence of 10 or less obtained by sequentially concatenating HARQ-ACK bits corresponding to the primary cell up to HARQ-ACK bits corresponding to a serving cell with a cell index for the first predetermined value. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

(3) Aspects of the present invention relate to a base station device including a reception unit configured to receive, with respect to PDSCH transmission on a secondary cell having a cell index less than or equal to a first predetermined value, a HARQ-ACK using a first PUCCH resource and a PUCCH format 3, and receive, with respect to PDSCH transmission on a secondary cell having a cell index greater than the first predetermined value, a HARQ-ACK using a second PUCCH resource and a PUCCH format 4. The first predetermined value may be a value of a fourth cell index when values of a set of cell indices set for a terminal device are arranged in ascending order. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

(4) Aspects of the present invention relate to a base station device including a reception unit configured to receive, with respect to PDSCH transmission on a secondary cell on a secondary cell having a cell index less than or equal to a first predetermined value, a HARQ-ACK using a first PUCCH resource and a PUCCH format 3, and receive, with respect to PDSCH transmission on a secondary cell on a secondary cell having a cell index greater than the first predetermined value, a HARQ-ACK using a second PUCCH resource and a PUCCH format 4. The first predetermined value may be a maximum cell index value with a bit sequence of 10 or less obtained by sequentially concatenating HARQ-ACK bits corresponding to the primary cell up to HARQ-ACK bits corresponding to a serving cell with a cell index for the first predetermined value. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

(5) Aspects of the present invention relate to a communication method for a terminal device. Aspects of the method may include transmitting, with respect to PDSCH transmission on a secondary cell on a secondary cell having a cell index less than or equal to a first predetermined value, a HARQ-ACK using a first PUCCH resource and a PUCCH format 3, and transmitting, with respect to PDSCH transmission on a secondary cell on a secondary cell having a cell index greater than the first predetermined value, a HARQ-ACK using a second PUCCH resource and a PUCCH format 4. The first predetermined value may be a value of a fourth cell index when values of a set of cell indices set by a base station device are arranged in ascending order. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

(6) Aspects of the present invention relate to a communication method for a terminal device. Aspects of the method may include transmitting, with respect to PDSCH transmission on a secondary cell on a secondary cell having a cell index less than or equal to a first predetermined value, a HARQ-ACK using a first PUCCH resource and a PUCCH format 3, and transmitting, with respect to PDSCH transmission on a secondary cell on a secondary cell having a cell index greater than the first predetermined value, a HARQ-ACK using a second PUCCH resource and a PUCCH format 4. The first predetermined value may be a maximum cell index value with a bit sequence of 10 or less obtained by sequentially concatenating HARQ-ACK bits corresponding to the primary cell up to HARQ-ACK bits corresponding to a serving cell with a cell index for the first predetermined value. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

(7) Aspects of the present invention relate to a communication method for a base station device. Aspects of the method may include receiving, with respect to PDSCH transmission on a secondary cell on a secondary cell having a cell index less than or equal to a first predetermined value, a HARQ-ACK using a first PUCCH resource and a PUCCH format 3, and receiving, with respect to PDSCH transmission on a secondary cell on a secondary cell having a cell index greater than the first predetermined value, a HARQ-ACK using a second PUCCH resource and a PUCCH format 4. The first predetermined value may be a value of a fourth cell index when values of a set of cell indices set for a terminal device are arranged in ascending order. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

(8) Aspects of the present invention relate to a communication method for a base station device. Aspects of the method may include receiving, with respect to PDSCH transmission on a secondary cell on a secondary cell having a cell index less than or equal to a first predetermined value, a HARQ-ACK using a first PUCCH resource and a PUCCH format 3, and receiving, with respect to PDSCH transmission on a secondary cell on a secondary cell having a cell index greater than the first predetermined value, a HARQ-ACK using a second PUCCH resource and a PUCCH format 4. The first predetermined value may be a maximum cell index value with a bit sequence of 10 or less obtained by sequentially concatenating HARQ-ACK bits corresponding to the primary cell up to HARQ-ACK bits corresponding to a serving cell with a cell index for the first predetermined value. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

(9) Aspects of the present invention relate to an integrated circuit mounted in a terminal device. The integrated circuit may cause the terminal device to perform a set of functions including transmitting, with respect to PDSCH transmission on a secondary cell on a secondary cell having a cell index less than or equal to a first predetermined value, a HARQ-ACK using a first PUCCH resource and a PUCCH format 3, and transmitting, with respect to PDSCH transmission on a secondary cell on a secondary cell having a cell index greater than the first predetermined value, a HARQ-ACK using a second PUCCH resource and a PUCCH format 4. The first predetermined value may be a value of a fourth cell index when values of a set of cell indices set by a base station device are arranged in ascending order. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

(10) Aspects of the present invention relate to an integrated circuit mounted in a terminal device. The integrated circuit may cause the terminal device to perform a set of functions including transmitting, with respect to PDSCH transmission on a secondary cell on a secondary cell having a cell index less than or equal to a first predetermined value, a HARQ-ACK using a first PUCCH resource and a PUCCH format 3, and transmitting, with respect to PDSCH transmission on a secondary cell on a secondary cell having a cell index greater than the first predetermined value, a HARQ-ACK using a second PUCCH resource and a PUCCH format 4. The first predetermined value may be a maximum cell index value with a bit sequence of 10 or less obtained by sequentially concatenating HARQ-ACK bits corresponding to the primary cell up to HARQ-ACK bits corresponding to a serving cell with a cell index for the first predetermined value. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

(11) Aspects of the present invention relate to an integrated circuit mounted in a base station device. The integrated circuit may cause the base station device to perform a set of functions including receiving, with respect to PDSCH transmission on a secondary cell on a secondary cell having a cell index less than or equal to a first predetermined value, a HARQ-ACK using a first PUCCH resource and a PUCCH format 3, and receiving, with respect to PDSCH transmission on a secondary cell on a secondary cell having a cell index greater than the first predetermined value, a HARQ-ACK using a second PUCCH resource and a PUCCH format 4. The first predetermined value may be a value of a fourth cell index when values of a set of cell indices set for a terminal device are arranged in ascending order. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

(12) Aspects of the present invention relate an integrated circuit mounted in a base station device. The integrated circuit may cause the base station device to perform a set of functions including receiving, with respect to PDSCH transmission on a secondary cell on a secondary cell having a cell index less than or equal to a first predetermined value, a HARQ-ACK using a first PUCCH resource and a PUCCH format 3, and receiving, with respect to PDSCH transmission on a secondary cell on a secondary cell having a cell index greater than the first predetermined value, a HARQ-ACK using a second PUCCH resource and a PUCCH format 4. The first predetermined value may be a maximum cell index value with a bit sequence of 10 or less obtained by sequentially concatenating HARQ-ACK bits corresponding to the primary cell up to HARQ-ACK bits corresponding to a serving cell with a cell index for the first predetermined value. The first PUCCH resource for transmission of the HARQ-ACK using the PUCCH format 3 may be designated based on at least a value set in an information field included in a downlink assignment for a secondary cell having a cell index less than or equal to the first predetermined value. The second PUCCH resource for transmission of the HARQ-ACK using the PUCCH format 4 may be designated based on at least a value set in an information field included in a downlink assignment for a secondary cell having a cell index greater than the first predetermined value.

Advantageous Effects of Invention

According to various aspects of the present invention, uplink control information can be transmitted efficiently.

BRIEF DESCRIPTION OF DRAWINGS

FIGS. 3A to 3C are diagrams illustrating PUCCH cell groups according to the present embodiment.

FIG. 5 is a diagram illustrating a predetermined value according to the present embodiment.

FIG. 6 is a diagram illustrating a method to process uplink control information according to the present embodiment.

FIG. 7 is a diagram illustrating a method to process uplink control information according to the present embodiment.

FIG. 8 is a diagram illustrating a method to process uplink control information according to the present embodiment.

DESCRIPTION OF EMBODIMENTS

Embodiments of the present invention will be described below.

Figure 1:
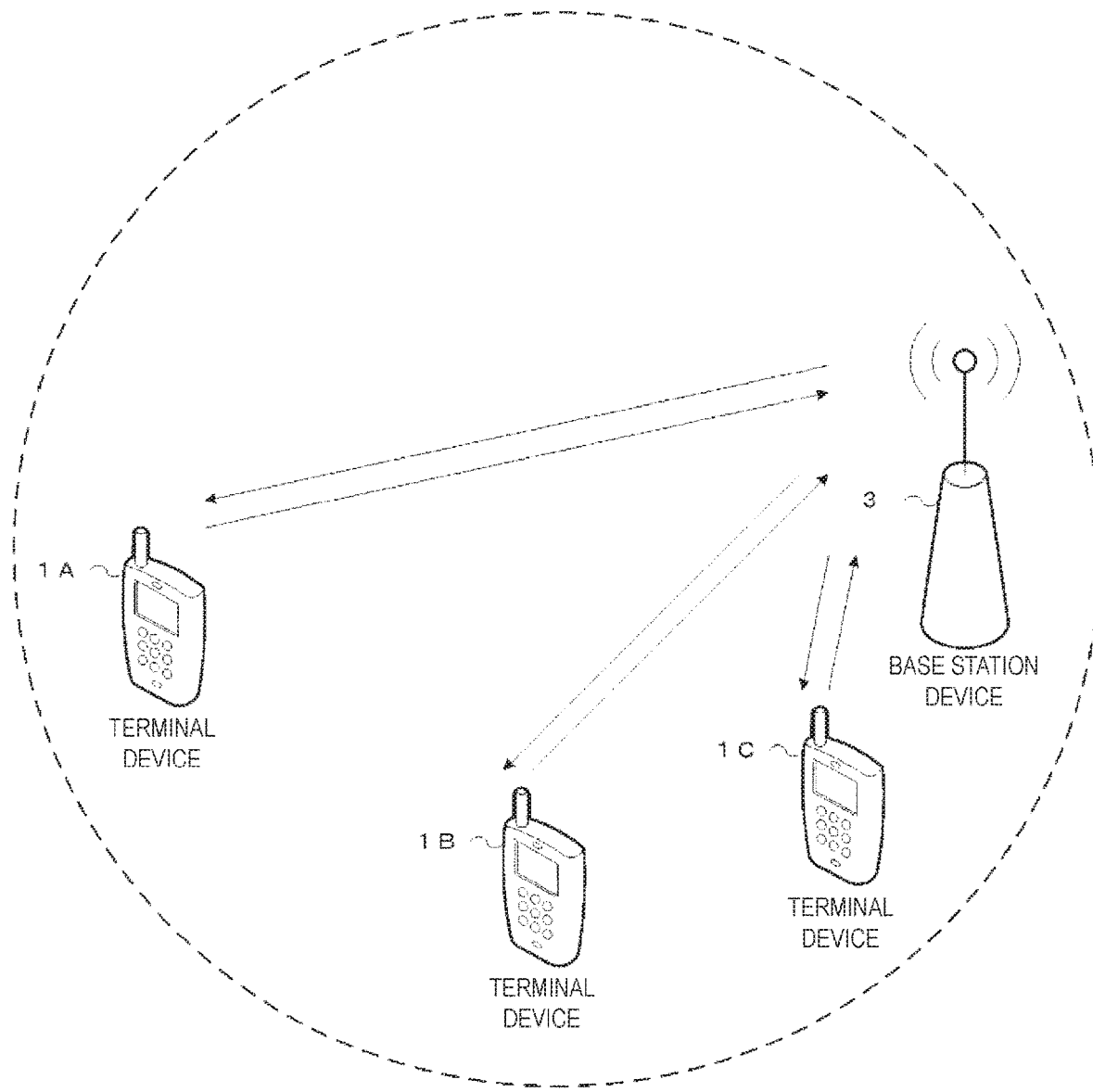
FIG. 1 is a diagram illustrating a concept of a radio communication system according to the present embodiment.

FIG. 1 is a conceptual diagram of a radio communication system according to the present embodiment. In FIG. 1, the radio communication system includes terminal devices 1A to 1C and a base station device 3. Hereinafter, the terminal devices 1A to 1C are each also referred to as a terminal device 1.

Physical channels and physical signals according to the present embodiment will be described.

With respect to FIG. 1, the following uplink physical channels are used for uplink radio communication from the terminal device 1 to the base station device 3. Here, the uplink physical channels are used to transmit information output from the higher layers.

Physical uplink control channel (PUCCH)
Physical uplink shared channel (PUSCH)
Physical random access channel (PRACH)

The PUCCH is used to transmit uplink control information (UCI). Here, the uplink control information may include channel state information (CSI) used to indicate a downlink channel state. The uplink control information may include scheduling request (SR) used to request an UL-SCH resource. The uplink control information may include hybrid automatic repeat request acknowledgment (HARQ-ACK). HARQ-ACK may indicate HARQ-ACK for downlink data (transport block, medium access control protocol data unit (MAC PDU), downlink-shared channel (DL-SCH), or physical downlink shared channel (PDSCH)).

In other words, HARQ-ACK may indicate acknowledgment (ACK) or negative-acknowledgment (NACK). Here, HARQ-ACK may also be referred to as ACK/NACK, HARQ feedback, HARQ acknowledgment, HARQ information, or HARQ control information.

The PUSCH is used to transmit uplink data (uplink-shared channel (UL-SCH)).

Furthermore, the PUSCH may be used to transmit HARQ-ACK and/or CSI along with the uplink data. Furthermore, the PUSCH may be used to transmit CSI only or HARQ-ACK and CSI only. In other words, the PUSCH may be used to transmit the uplink control information only.

Here, the base station device 3 and the terminal device 1 exchange (transmit and receive) signals with each other in the higher layers. For example, the base station device 3 and the terminal device 1 may transmit and receive radio resource control (RRC) signaling (also referred to as RRC message or RRC information) in the RRC layer, respectively. The base station device 3 and the terminal device 1 may transmit and receive a medium access control (MAC) element in the MAC layer, respectively. Here, the RRC signaling and/or the MAC control element is also referred to as higher layer signaling.

The PUSCH may be used to transmit the RRC signaling and the MAC control element. Here, the RRC signaling transmitted from the base station device 3 may be signaling common to multiple terminal devices 1 in a cell. The RRC signaling transmitted from the base station device 3 may be signaling dedicated to a certain terminal device 1 (also referred to as dedicated signaling). In other words, user-equipment-specific information (information unique to user equipment) may be transmitted through signaling dedicated to the certain terminal device 1.

The PRACH is used to transmit a random access preamble. The PRACH may be used for an initial connection establishment procedure, a handover procedure, a connection re-establishment procedure, uplink transmission synchronization (timing adjustment), and designating a PUCCH resource request.

In FIG. 1, the following uplink physical signal is used in the uplink radio communication. Here, the uplink physical signal is not used to transmit information output from the higher layers but is used by the physical layer.

Uplink reference signal (UL RS)

According to the present embodiment, the following two types of uplink reference signals are used.

Demodulation reference signal (DMRS)
Sounding reference signal (SRS)

The DMRS is associated with transmission of the PUSCH or the PUCCH. The DMRS is time-multiplexed with the PUSCH or the PUCCH. The base station device 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station device 3 uses the SRS in order to measure an uplink channel state.

In FIG. 1, the following downlink physical channels are used for downlink radio communication from the base station device 3 to the terminal device 1. Here, the downlink physical channels are used to transmit the information output from the higher layers.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used to broadcast a master information block (MIB), or a broadcast channel (BCH), that is shared by the terminal devices 1.

The PCFICH is used to transmit information designating a region (OFDM symbols) to be used for transmission of the PDCCH.

The PHICH is used to transmit a HARQ indicator (HARQ feedback or acknowledgment information) designating acknowledgment (ACK) or negative acknowledgment (NACK) with respect to the uplink data (uplink shared channel (UL-SCH)) received by the base station device 3.

The PDCCH and the EPDCCH are used to transmit downlink control information (DCI). Here, multiple DCI formats are defined for transmission of the downlink control information. In other words, a field for the downlink control information is defined in a DCI format and is mapped to information bits.

For example, DCI formats for downlink (e.g., DCI format 1A and DCI format 1C) to be used for the scheduling of one PDSCH in one cell (transmission of a single downlink transport block) may be defined.

Here, each of the downlink DCI formats includes information on the scheduling of the PDSCH. For example, the downlink DCI format includes downlink control information such as a carrier indicator field (CIF), information on resource block assignment, or information on a modulation and coding scheme (MCS). Here, the downlink DCI format is also referred to as downlink grant or downlink assignment.

Furthermore, for example, DCI formats for uplink (e.g., DCI format 0 and DCI format 4) to be used for the scheduling of one PUSCH in one cell (transmission of a single uplink transport block) are defined.

Here, each of the uplink DCI formats includes information on the scheduling of the PUSCH. For example, the uplink DCI format includes downlink control information such as a carrier indicator field (CIF), information on resource block assignment and/or hopping resource allocation, information on modulation and coding scheme (MCS) and/or redundancy version, or information used for designating the number of transmission layers (precoding information and the number of layers). Here, the uplink DCI format is also referred to as uplink grant or uplink assignment.

In a case where a PDSCH resource is scheduled in accordance with the downlink assignment, the terminal device 1 may receive downlink data on the scheduled PDSCH. In a case where a PUSCH resource is scheduled in accordance with the uplink grant, the terminal device 1 may transmit uplink data and/or uplink control information on the scheduled PUSCH.

Here, the terminal device 1 may monitor a set of PDCCH candidates and/or EPDCCH candidates. The PDCCH may indicate a PDCCH and/or an EPDDCH below. Here, the PDCCH candidates are candidates which the PDCCH may be mapped to and/or transmitted on by the base station device 3. Furthermore "monitor" may imply that the terminal device 1 attempts to decode each PDCCH in the set of PDCCH candidates in accordance with each of all the monitored DCI formats.

The set of PDCCH candidates to be monitored by the terminal device 1 is also referred to as a search space. The search space may include a common search space (CSS). For example, the CSS may be defined as a space common to multiple terminal devices 1. The search space may include a UE-specific search space (USS). For example, the USS may be defined at least on the basis of a C-RNTI assigned to the terminal device 1. The terminal device 1 may monitor PDCCHs in CSS/or USS to detect a PDCCH destined for the terminal device 1 itself.

Here, an RNTI assigned to the terminal device 1 by the base station device 3 is used for the transmission of downlink control information (transmission on the PDCCH). Specifically, cyclic redundancy check (CRC) parity bits are attached to a DCI format (or downlink control information), and after the attachment, the CRC parity bits are scrambled with the RNTI. Here, the CRC parity bits attached to the DCI format may be obtained from the payload of the DCI format.

The terminal device 1 attempts to decode the DCI format to which the CRC parity bits scrambled with the RNTI have been attached, and detects, as a DCI format destined for the terminal device 1 itself, the DCI format for which the CRC has been successful (also referred to as blind coding). In other words, the terminal device 1 may detect the PDCCH with CRC scrambled with the RNTI. The terminal device 1 may detect the PDCCH including the DCI format to which the CRC parity bits scrambled with the RNTI have been attached.

Here, the RNTI may include a cell-radio network temporary identifier (C-RNTI). The C-RNTI is an identifier unique to the terminal device 1 and used for the identification in RRC connection and scheduling. The C-RNTI may be used for dynamically scheduled unicast transmission.

The RNTI may further include a semi-persistent scheduling C-RNTI (SPS C-RNTI). The SPS C-RNTI is an identifier unique to the terminal device 1 and used for semi-persistent scheduling. The SPS C-RNTI may be used for semi-persistently scheduled unicast transmission.

The PDSCH is used to transmit downlink data (downlink shared channel (DL-SCH)). The PDSCH is used to transmit a system information message. Here, the system information message may be cell-specific information (information unique to a cell). The system information is included in RRC signaling. The PDSCH is used to transmit the RRC signaling and the MAC control element.

The PMCH is used to transmit multicast data (multicast channel (MCH)).

In FIG. 1, the following downlink physical signals are used for downlink radio communication. Here, the downlink physical signals are not used to transmit the information output from the higher layers but is used by the physical layer.

Synchronization signal (SS)
Downlink reference signal (DL RS)

The synchronization signal is used in order for the terminal device 1 to be synchronized in terms of frequency and time domains for downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used in order for the terminal device 1 to perform channel compensation for the downlink physical channel. The downlink reference signal is used in order for the terminal device 1 to obtain the downlink channel state information.

According to the present embodiment, the following five types of downlink reference signals are used.

Cell-specific reference signal (CRS)
UE-specific reference signal (URS) associated with the PDSCH
Demodulation reference signal (DMRS) associated with the EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

Here, the downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signals and the uplink physical signals are collectively referred to as a physical signal.

The BCH, the MCH, the UL-SCH, and the DL-SCH are transport channels. A channel used in the medium access control (MAC) layer is referred to as a transport channel. The unit of the transport channel used in the MAC layer may also be referred to as a transport block (TB) or a MAC protocol data unit (PDU). Control of a hybrid automatic repeat request (HARQ) is performed on each transport block in the MAC layer. The transport block is a unit of data that the MAC layer delivers to the physical layer. In the physical layer, the transport block is mapped to a codeword and subject to coding processing on a codeword-by-codeword basis.

Carrier aggregation will be described below.

In the present embodiment, one or multiple serving cells may be configured for the terminal device 1. A technology in which the terminal device 1 communicates via multiple serving cells is referred to as cell aggregation or carrier aggregation.

Here, the present embodiment may apply to one or each of the multiple serving cells configured for the terminal device 1. Alternatively, the present embodiment may apply to one or some of the multiple serving cells configured for the terminal device 1. Alternatively, the present embodiment may apply to one or each of the multiple serving cell groups (e.g., PUCCH cell groups) configured for the terminal device 1, which will be described later. Alternatively, the present embodiment may apply to one or some of the multiple serving cell groups configured for the terminal device 1.

In the present embodiment, time division duplex (TDD) and/or frequency division duplex (FDD) may be applied. Here, for carrier aggregation, TDD or FDD may apply to one or all of the multiple serving cells. Alternatively, serving cells to which TDD applies and serving cells to which FDD applies may be aggregated. Here, a frame structure for FDD is also referred to as frame structure type 1. A frame structure for TDD is referred to as frame structure type 2.

Here, the one or multiple configured serving cells include one primary cell and one or multiple secondary cells. The primary cell may be a serving cell in which an initial connection establishment procedure has been performed, a serving cell in which a connection re-establishment procedure has been initiated, or a cell indicated as the primary cell in a handover procedure. Here, upon an RRC connection being established or later, a secondary cell(s) may be configured.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 may simultaneously perform transmission and/or reception on multiple physical channels in one or multiple serving cells (component carrier(s)). Here, transmission of one physical channel may be performed in one serving cell (component carrier) of the multiple serving cells (component carriers).

Here, the primary cell is used for the transmission on the PUCCH. The primary cell cannot be deactivated. The cross-carrier scheduling does not apply to the primary cell. In other words, the primary cell is always scheduled via its PDCCH.

In a case where PDCCH (or PDCCH monitoring) of a secondary cell is configured, cross-carries scheduling may not apply this secondary cell. To be more specific, in this case, the secondary cell may always be scheduled via its PDCCH. In a case where no PDCCH (or PDCCH monitoring) of a secondary cell is configured, cross-carrier scheduling applies to the secondary cell, and the secondary cell may always be scheduled via the PDCCH in one other serving cell.

Here, in the present embodiment, a secondary cell used for transmission on the PUCCH is referred to as a PUCCH secondary cell or a special secondary cell. In the present embodiment, a secondary cell not used to transmit a PUCCH is referred to as a non-PUCCH secondary cell, a non-special secondary cell, a non-PUCCH serving cell, or a non-PUCCH cell. The primary cell and the PUCCH secondary cell are collectively referred to as a PUCCH serving cell or a PUCCH cell.

Here, the PUCCH serving cell (the primary cell or the PUCCH secondary cell) always includes a downlink component carrier and an uplink component carrier. In the PUCCH serving cell (the primary cell or the PUCCH secondary cell), PUCCH resources are configured.

The non-PUCCH serving cell (the non-PUCCH secondary cell) may include a downlink component carrier only. Alternatively, the non-PUCCH serving cell (the non-PUCCH secondary cell) may include a downlink component carrier and an uplink component carrier.

The terminal device 1 performs transmission on the PUCCH in the PUCCH serving cell. To be more specific, the terminal device 1 performs transmission on the PUCCH on the primary cell. Moreover, the terminal device 1 performs transmission on the PUCCH in the PUCCH secondary cell. To be more specific, the terminal device 1 does not perform transmission on the PUCCH in the non-special secondary cell.

Here, the PUCCH secondary cell may be defined as a serving cell that is neither the primary cell nor a secondary cell.

To be more specific, the PUCCH secondary cell may be used for the transmission on the PUCCH. The PUCCH secondary cell may not be deactivated. Here, as will be described later, the PUCCH secondary cell may be activated and/or deactivated.

Cross-carrier scheduling may not apply to PUCCH secondary cell. In other words, PUCCH secondary cell is always scheduled via its PDCCH in PUCCH secondary cell. Here, cross-carrier scheduling may apply to PUCCH secondary cell. To be more specific, the PUCCH secondary cell may be scheduled via the PDCCH in one other serving cell.

For example, in a case where PDCCH (or PDCCH monitoring) of a PUCCH secondary cell is configured, cross-carries scheduling may not apply this PUCCH secondary cell. To be more specific, in this case, the PUCCH secondary cell may always be scheduled via its PDCCH in the PUCCH secondary cell. In a case where no PDCCH (or PDCCH monitoring) of the PUCCH secondary cell is configured, cross-carrier scheduling applies to the PUCCH secondary cell, and the PUCCH secondary cell may always be scheduled via the PDCCH in one other serving cell.

Here, linking may be defined between the uplink (e.g., the uplink component carrier) and the downlink (e.g., the downlink component carrier). In other words, on the basis of the linking between the uplink and the downlink, the serving cell responsible for a downlink assignment (the serving cell in which PDSCH transmission scheduled in accordance with the downlink assignment (downlink transmission) is performed) may be identified. Moreover, on the basis of the linking between the uplink and the downlink, the serving cell responsible for an uplink grant (the serving cell in which transmission on the PUSCH scheduled in accordance with the uplink grant (uplink transmission) is performed) may be identified. Here, no carrier indicator field is present in the downlink assignment or the uplink.

In other words, the downlink assignment received on the primary cell may correspond to downlink transmission on the primary cell. Moreover, the uplink grant received on the primary cell may correspond to uplink transmission on the primary cell. The downlink assignment received in the PUCCH secondary cell may correspond to downlink transmission on the PUCCH secondary cell. Moreover, the uplink grant received in the PUCCH secondary cell may correspond to uplink transmission on the PUCCH secondary cell.

The downlink assignment received in a certain secondary cell (the PUCCH secondary cell and/or the non-PUCCH secondary cell) may correspond to downlink transmission on the certain secondary cell. Moreover, the uplink grant received in a certain secondary cell (the PUCCH secondary cell and/or the non-PUCCH secondary cell) may correspond to uplink transmission on the certain secondary cell.

Here, the base station device 3 may configure one or multiple serving cells through higher layer signaling. For example, one or multiple secondary cells may form a set of multiple serving cells with the primary cell. Here, the serving cells configured by the base station device 3 may include a PUCCH secondary cell.

To be more specific, the PUCCH secondary cell may be configured by the base station device 3. For example, the base station device 3 may transmit higher layer signals that include information that may be used to configure the PUCCH secondary cell.

The base station device 3 may activate or deactivate one or multiple serving cells through higher layer signaling (e.g., a MAC control element). For example, the activation or deactivation mechanism may be based on a combination of the MAC control element and a deactivation timer.

Here, secondary cells activated or deactivated by the base station device 3 may include a PUCCH secondary cell. To be more specific, the base station device 3 may solely activate or deactivate multiple secondary cells including the PUCCH secondary cell through a single activation/deactivation command. In other words, the base station device 3 may transmit the single activation/deactivation command to be used to activate or deactivate secondary cells through the MAC control element.

As a value for the deactivation timer, a common value may be set for each terminal device 1 by the higher layers (e.g., the RRC layer). The deactivation timer (the value of the timer) may be maintained for (apply to) each of the secondary cells. Here, the deactivation timer (the value of the timer) may be maintained for each of the non-PUCCH secondary cells only. In other words, the terminal device 1 may maintain (apply) the deactivation timer for (to) each of the non-PUCCH secondary cells only, without applying the deactivation timer to the PUCCH secondary cells.

Alternatively, a deactivation timer for PUCCH secondary cells and a deactivation timer for non-PUCCH secondary cells may be configured separately. For example, the base station device 3 may transmit higher layer signaling including the deactivation timer for the PUCCH secondary cells and information on the configuration of the deactivation timer. Moreover, the base station device 3 may transmit higher layer signaling including the deactivation timer for the non-PUCCH secondary cells and information on the configuration of the deactivation timer.

A configuration of a slot according to the present embodiment will be described below.

Figure 2:
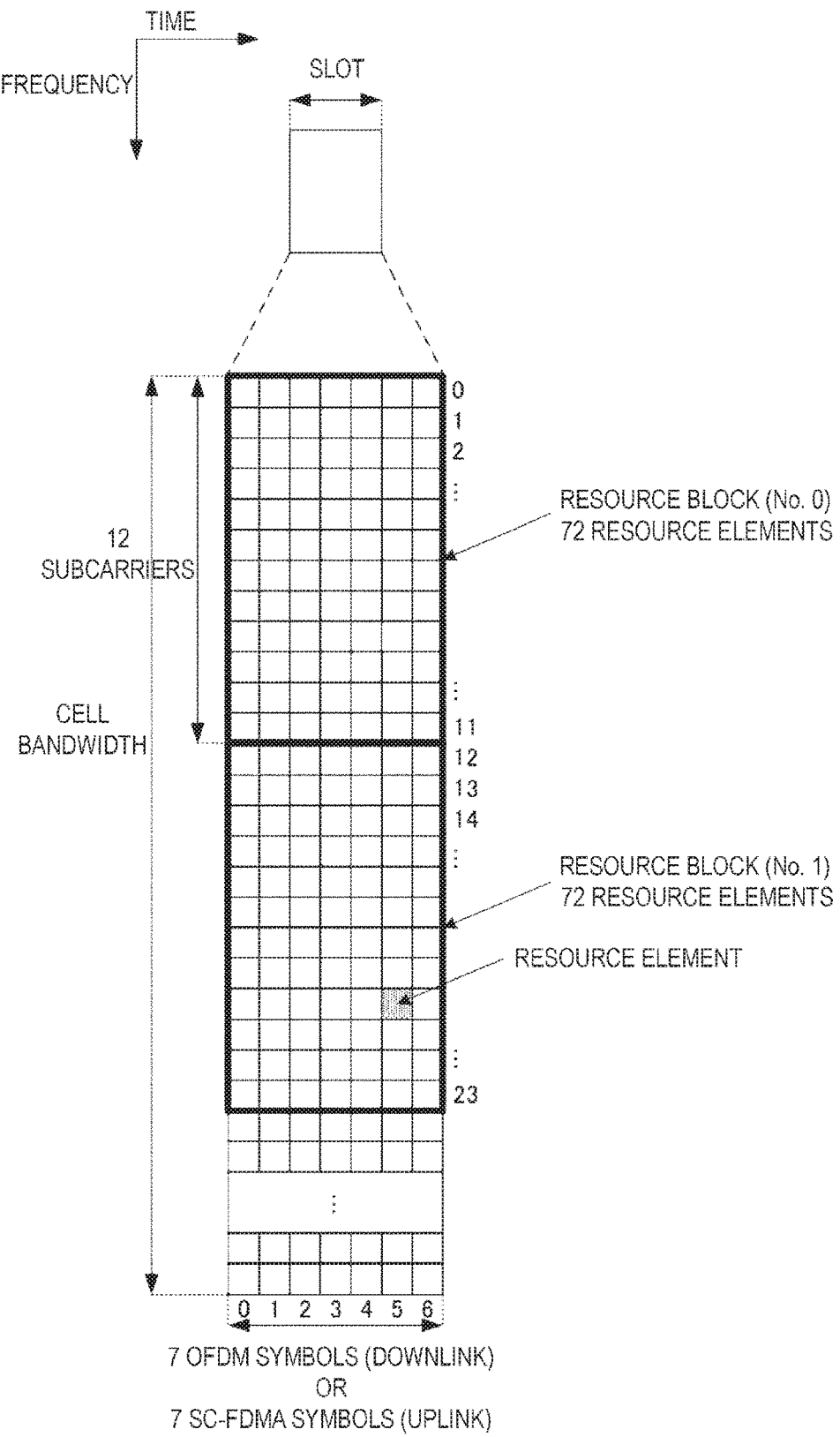
FIG. 2 is a diagram illustrating a configuration of a slot according to the present embodiment.

FIG. 2 is a diagram illustrating the configuration of the slot according to the present embodiment. In FIG. 2, the horizontal axis represents a time axis, and the vertical axis represents a frequency axis. Here, a normal cyclic prefix (CP) may apply to an OFDM symbol. Alternatively, an extended cyclic prefix (CP) may apply to the OFDM symbol. The physical signal or the physical channel transmitted in each of the slots is expressed by a resource grid.

Here, in the downlink, the resource grid may be defined with multiple subcarriers and multiple OFDM symbols. In the uplink, the resource grid may be defined with multiple subcarriers and multiple SC-FDMA symbols. The number of subcarriers constituting one slot may depend on a cell bandwidth. The number of OFDM symbols or SC-FDMA symbols constituting one slot may be seven. Here, each element within the resource grid is referred to as a resource element. The resource element may be identified by a subcarrier number and an OFDM symbol or SC-FDMA symbol number.

Here, a resource block may be used to express mapping of a certain physical channel (the PDSCH, the PUSCH, or the like) to resource elements. For the resource block, a virtual resource block and a physical resource block may be defined. A certain physical channel may be first mapped to the virtual resource block. Thereafter, the virtual resource block may be mapped to the physical resource block. One physical resource block may be defined with seven consecutive OFDM symbols or SC-FDMA symbols in the time domain and by 12 consecutive subcarriers in the frequency domain. Thus, one physical resource block may be constituted of (7×12) resource elements. Furthermore, one physical resource block may correspond to one slot in the time domain and correspond to 180 kHz in the frequency domain. The physical resource blocks may be numbered from zero in the frequency domain.

FIGS. 3A to 3C are diagrams illustrating PUCCH cell groups according to the present embodiment. In FIGS. 3A to 3C, three examples (Example (a), Example (b), and Example (c)) are provided as examples of a configuration (constitution or definition) of a PUCCH cell group. Here, in the present embodiment, a group of multiple serving cells may be referred to as a PUCCH cell group. The PUCCH cell group may be a group associated with transmission on the PUCCH (transmission of uplink control information on the PUCCH). Here, a certain serving cell belongs to any one of PUCCH cell groups. Here, it goes without saying that the PUCCH cell group may be configured differently from the examples illustrated in FIGS. 3A to 3C.

The secondary PUCCH cell group may be configured by the base station device 3. For example, the base station device 3 may transmit higher layer signallings that include information (or index, or cell group index) that may be used to configure the PUCCH cell group.

Naturally, aspects of the present embodiment may be applied to one or a plurality of serving cell groups other than the above-described PUCCH cell group. For example, the base station device 3 may configure one or a plurality of groups of serving cells corresponding to the serving cell instructed by the carrier indicator field (CIF). Here, the base station device 3 may configure one or multiple serving cells through association with the uplink transmission. Further, the base station device 3 may configure one or multiple serving cells through association with the downlink transmission.

In the following description, a group of one or more serving cells configured by the base station device 3 may also be referred to as a cell group. That is, the PUCCH cell group is included in the cell group. Herein, the base station device 3 and/or the terminal device 1 may execute the operations described with respect to the present embodiment in each of the cell groups. To be more specific, the base station device 3 and/or the terminal device 1 may perform the operations described with respect to the present embodiment in one cell group.

Herein, for example, the base station device 3 and/or the terminal device 1 of the present embodiment may support carrier aggregation of up to 32 downlink component carriers (downlink cells), for example. In other words, the base station device 3 and/or the terminal device 1 can simultaneously perform transmission and/or reception on multiple physical channels in up to 32 serving cells. Here, the number of uplink component carriers may be less than the number of downlink component carriers.

Herein, for example, the base station device 3 and/or the terminal device 1 of the present embodiment may support carrier aggregation of up to 5 downlink component carriers (downlink cells). In other words, the base station device 3 and/or the terminal device 1 can simultaneously perform transmission and/or reception on multiple physical channels in up to 5 serving cells. Here, the number of uplink component carriers may be less than the number of downlink component carriers.

FIG. 3A illustrates that a first PUCCH cell group and a second cell group are configured as a cell group (the PUCCH cell groups). For example, in FIG. 3A, the base station device 3 may transmit a downlink signal in the first cell group, and the terminal device 3 may transmit an uplink signal in the first cell group (may transmit uplink control information on the PUCCH in the first cell group). For example, in a case where 20 serving cells (downlink component carriers or downlink cells) are configured or activated in the first cell group, the base station device 3 and the terminal device 1 may transmit and receive uplink control information for the 20 downlink component carriers, respectively.

To be more specific, the terminal device 1 may transmit HARQ-ACK for the 20 downlink component carriers (HARQ-ACK for PDSCH transmission and HARQ-ACK for transport blocks). The terminal device 1 may transmit CSI corresponding to each of the 20 downlink component carriers. The terminal device 1 may transmit SRs for each cell group. Similarly, the base station device 3 and the terminal device 1 may transmit and receive uplink control information in the second cell group, respectively.

Similarly, the base station device 3 and the terminal device 1 may configure a cell group as illustrated in FIG. 3B, and transmit and receive uplink control information, respectively. Also, the base station device 3 and the terminal device 1 may configure a cell group as illustrated in FIG. 3C, and transmit and receive uplink control information respectively.

Herein, one cell group (e.g., a PUCCH cell group) may include at least one serving cell (e.g., a PUCCH serving cell). Additionally, in certain embodiments, one cell group (e.g., a PUCCH cell group) may include only one serving cell (e.g., only one PUCCH serving cell). Further, for example, one PUCCH cell group may include one PUCCH serving cell and one or multiple non-PUCCH serving cells.

Herein, cell groups including the primary cell may be referred to as primary cell groups. Further, cell groups that do not include the primary cell are referred to as secondary cell groups. PUCCH cell groups including the primary cell may be referred to as primary PUCCH cell groups. PUCCH cell groups that do not include the primary cell may be referred to as secondary PUCCH cell groups.

In other words, the secondary PUCCH cell group may include a PUCCH secondary cell. For example, the index for the primary PUCCH cell group may always be defined as 0. The index for the secondary PUCCH cell group may be configured by the base station device 3 (or a network device).

The base station device 3 may transmit information, to be used to indicate the PUCCH secondary cell, included in higher layer signaling and/or the PDCCH (downlink control information transmitted on the PDCCH). The terminal device 1 may determine the PUCCH secondary cell in accordance with the information to be used to indicate the PUCCH secondary cell. Herein, the cell index of the PUCCH secondary cell may be predefined according to specification information and the like.

As described above, the PUCCH in the PUCCH serving cell may be used to transmit uplink control information (HARQ-ACK, CSI (e.g., periodic CSI), and/or SR) for serving cells (the PUCCH serving cell and the non-PUCCH serving cell) included in the PUCCH cell group to which the PUCCH serving cell belongs.

In other words, uplink control information (HARQ-ACK, CSI (e.g., periodic CSI), and/or SR) for the serving cells (the PUCCH serving cell and the non-PUCCH serving cell) included in the PUCCH cell group is transmitted on the PUCCH in the PUCCH serving cell included in the PUCCH cell group.

Here, the present embodiment may apply only to transmission of HARQ-ACK. Alternatively, the present embodiment may apply only to transmission of CSI (e.g., periodic CSI). Alternatively, the present embodiment may apply only to transmission of SR. Alternatively, the present embodiment may apply to transmission of HARQ-ACK, transmission of CSI (e.g., periodic CSI), and/or transmission of SR.

In other words, for example, a cell group (or the PUCCH cell group) may be configured for transmission of HARQ-ACK. A cell group (or the PUCCH cell group) may be configured for transmission of CSI (e.g., periodic CSI). A cell group (or the PUCCH cell group) may be configured for transmission of SR.

For example, a cell group for transmission of HARQ-ACK, a cell group for transmission of CSI (e.g., periodic CSI), and/or a cell group for transmission of SR may be configured separately. Alternatively, a shared cell group may be configured as a cell group for transmission of HARQ-ACK, a cell group for transmission of CSI (e.g., periodic CSI), and/or a cell group for transmission of SR.

Herein, the number of cell groups used for transmission of HARQ-ACK may be one or two. The number of cell groups used for transmission of CSI may be one or two. The number of cell groups used for transmission of SR may be one or two. As will be described later, a cell group for transmission of CSI (e.g., periodic CSI) and/or a cell group for transmission of SR need not be configured (defined).

Here, multiple formats may be defined (supported) for the PUCCH. Each format supported for the PUCCH (the format that the PUCCH supports) is also referred to as a PUCCH format. For example, the use of the following PUCCH formats allows combinations of pieces of uplink control information on the PUCCH (transmission of combinations of pieces of uplink control information) to be supported.

Format 1
Format 1a
Format 1b
Format 2
Format 2a
Format 2b
Format 3
Format 4

PUCCH format 1 may be defined for positive SR. For example, the positive SR may be used to indicate that an UL-SCH resource is requested. Here, negative SR may be used to indicate that an UL-SCH resource is not requested. PUCCH format 1 is also referred to as a first PUCCH format below.

PUCCH format 1a may be defined for 1-bit HARQ-ACK or 1-bit HARQ-ACK with positive SR. PUCCH format 1b may be defined for 2-bit HARQ-ACK or 2-bit HARQ-ACK with positive SR. PUCCH format 1b may be defined for transmission of up to 4-bit HARQ-ACK with channel selection. PUCCH format 1a and/or PUCCH format 1b is also referred to as a second PUCCH format below.

PUCCH format 2 may be defined for a CSI report when not multiplexed with HARQ-ACK. PUCCH format 2a may be defined for a CSI report multiplexed with 2-bit HARQ-ACK. PUCCH format 2b may be defined for a CSI report multiplexed with 1-bit HARQ-ACK. Here, PUCCH format 2 may be defined for a CSI report multiplexed with HARQ-ACK for extended cyclic prefix. PUCCH format 2, PUCCH format 2a, and/or PUCCH format 2b is also referred to as a third PUCCH format below.

PUCCH format 3 may be defined for up to 10-bit HARQ-ACK. For example, PUCCH format 3 may be defined for up to 10-bit HARQ-ACK for FDD or FDD-TDD primary cell frame structure type 1.

PUCCH format 3 may be defined for up to 20-bit HARQ-ACK. For example, PUCCH format 3 may be defined for up to 20-bit HARQ-ACK for TDD. Also, the PUCCH format 3 may be defined for up to 21-bit HARQ-ACK. For example, PUCCH format 3 may be defined for up to 21-bit HARQ-ACK for FDD or FDD-TDD primary cell frame structure type 2.

Alternatively, PUCCH format 3 may be defined for up to 11-bit corresponding to up to 10-bit HARQ-ACK and 1-bit positive/negative SR. Herein, for example, PUCCH format 3 may be defined for 11-bits or less corresponding to 10-bit HARQ-ACK and 1-bit positive/negative SR may be defined for FDD or FDD-TDD.

Alternatively, PUCCH format 3 may be defined for up to 21-bit corresponding to up to 20-bit HARQ-ACK and 1-bit positive/negative SR. Herein, PUCCH format 3 may be defined for 21 bits or less corresponding to 20-bit HARQ-ACK and 1 bit positive/negative SR for TDD. Additionally, PUCCH format 3 may be defined for up to 22 bits or less corresponding to 21 bit HARQ-ACK and 1 bit positive/negative SR. Herein, for FDD-TDD primary cell frame structure type 2, PUCCH format 3 may be defined for 22 bits or less corresponding to 21-bit HARQ-ACK and 1 bit positive/negative SR.

Herein, in the case where the uplink control information (HARQ-ACK, SR, and/or CSI) is transmitted using PUCCH format 3, a first coding method (e.g., Reed Muller coding or (32, 0) block coding) may be used. Herein, for example, reference sequences (basis sequences) for (32, 0) block code may be provided in advance by specification information or the like.

PUCCH format 3 may be defined for HARQ-ACK and a CSI report for one serving cell. Alternatively, PUCCH format 3 may be defined for HARQ-ACK, 1-bit positive/negative SR (if any), and a CSI report for one serving cell. PUCCH format 3 is also referred to as a fourth PUCCH format below.

PUCCH format 4 may be defined for HARQ-ACK corresponding to up to 32 serving cells (downlink component carriers or downlink cells). Alternatively, PUCCH format 4 may be defined for HARQ-ACK and a CSI report. Alternatively, PUCCH format 4 may be defined for HARQ-ACK and SR. Alternatively, PUCCH format 4 may be defined for HARQ-ACK, SR, and a CSI report. Here, the CSI report may be a CSI report for one serving cell. Alternatively, the CSI report may be a CSI report for multiple serving cells. SR may be positive SR and/or negative SR. PUCCH format 4 is also referred to as a fifth PUCCH format below.

Herein, in the case where the uplink control information (HARQ-ACK, SR, and/or CSI) is transmitted using PUCCH format 4, a second coding method (e.g., Tail biting convolutional encoder (Tail biting convolutional coding) or Turbo encoder (Turbo coding)) may be used.

That is, the number of bits per subframe transmitted (transmittable) using PUCCH format 4 may be greater than the number of bits per subframe transmitted (transmittable) using PUCCH format 3. More particularly, the amount of information per subframe transmitted (transmittable) using PUCCH format 4 may be larger than the amount of information transmitted (transmittable) per subframe using PUCCH format 3. Also, as described above, different coding methods may be used with respect to transmission of uplink control information using PUCCH format 3 and transmission of uplink control information using PUCCH format 4.

Herein, in the case where the HARQ-ACK is transmitted using the third PUCCH format, the terminal device 1 may determine the number of HARQ-ACK bits at least on the basis of the number of configured serving cells and the downlink transmission mode configured for each serving cell (each of the configured serving cells). Herein, in the case where the HARQ-ACK is transmitted using a fifth PUCCH format, the terminal device 1 may determine the number of HARQ-ACK bits at least on the basis of the number of configured or activated serving cells and the downlink transmission mode configured for each serving cell (each of the configured or activated serving cells).

Also, in the case where the HARQ-ACK is transmitted using a fourth PUCCH format, the terminal device 1 may determine the number of HARQ-ACK bits at least on the basis of the number of configured serving cells and the downlink transmission mode configured for each serving cell (each of the configured serving cells). Herein, in the case where the HARQ-ACK is transmitted using a fifth PUCCH format, the terminal device 1 may determine the number of HARQ-ACK bits at least on the basis of the number of configured or activated serving cells and the downlink transmission mode configured for each serving cells (each of the configured or activated serving cells).

For example, the terminal device 1 may use a 2-bit HARQ-ACK for serving cells for which a downlink transmission mode supporting up to two transport blocks is configured, and may otherwise use 1-bit HARQ-ACK (e.g., for serving cells for which a downlink transmission mode supporting one transport block is configured). Herein, for example, downlink transmission modes supporting up to two transport blocks may include transmission mode 3, transmission mode 4, transmission mode 8, transmission mode 9, and/or transmission mode 10. Also, downlink transmission modes supporting one transport block may include transmission mode 1, transmission mode 2, transmission mode 5, transmission mode 6, and/or transmission mode 7.

As described above, the base station device 3 may configure the serving cell to the terminal device 1 using a higher layer signaling (e.g., RRC signaling). Also, the base station device 3 may configure the downlink transmission mode for the terminal device 1 using a higher layer signaling (e.g., RRC signaling). For example, the base station device 3 may configure the downlink transmission mode related to PDSCH transmission for the terminal device 1. For transmission of HARQ-ACK using the third PUCCH format and/or the fourth PUCCH format, the number of HARQ-ACK bits may be determined in the RRC layer (based on information in the RRC layer).

Herein, the base station device 3 may configure, through higher layer signaling (information transmitted using higher layer signaling) and/or the PDCCH (downlink control information transmitted on the PDCCH), the terminal device 1 to make use of any one of PUCCH format 1b with channel selection, PUCCH format 3, or PUCCH format 4 for transmission of uplink control information (e.g., HARQ-ACK transmission). In other words, the base station device 3 may configure, through higher layer signaling, the terminal device 1 to use PUCCH format 1b with channel selection for transmission of uplink control information. Also, the base station device 3 may configure the terminal device 1 to use the PUCCH format 3 for transmission of the uplink control information. Also, the base station device 3 may configure the terminal device 1 to use the PUCCH format 4 for transmission of the uplink control information.

For example, the base station device 3 may configure the terminal device 1 to use one of the PUCCH format 1b with channel selection, the PUCCH format 3, and/or the PUCCH format 4 for each cell group. In other words, the base station device 3 may independently configure, for each cell group, the terminal device 1 to use one of the PUCCH format 1b with channel selection, the PUCCH format 3, and/or the PUCCH format 4. That is, the terminal device 1 may be configured by the base station device 3 to use one of the PUCCH format 1b with channel selection, the PUCCH format 3, and/or the PUCCH format 4.

Also, in the case where more than one serving cell (e.g., more than one but less than 5) are configured with frame structure type 1 and/or frame structure type 2, the terminal device 1 may be configured, by the base station device 3, to use one of the PUCCH format 1b with channel selection, the PUCCH format 3, and/or the PUCCH format 4. Further, in the case where more than 5 serving cells are configured with frame structure type 1 and/or frame structure type 2, the terminal device 1 may be configured, by the base station device 3, to use one of the PUCCH format 1b with channel selection, PUCCH format 3, or PUCCH format 4.

Although the following description describes operations in the terminal device 1, it is a matter of course that the base station device 3 may perform corresponding actions with respect to the terminal device 1. Also, the operations described below in accordance with the present embodiment may be performed individually for each cell group. To be more specific, the base station device 3 and/or the terminal device 1 may perform the operations to be described in accordance with the present embodiment within a single cell group.

Further, for example, the operations described with respect to the present embodiment may also be applied to the case where the PUCCH format 3 is configured for transmission of the uplink control information (e.g., transmission of HARQ-ACK). Also, for example, the operations described with respect to the present embodiment may also be applied to the case where the PUCCH format 4 is configured for transmission of the uplink control information (e.g., transmission of HARQ-ACK).

Further, the operations described in the present embodiment may be applicable to a case where one serving cell is configured. Further, the operations described in the present embodiment may be applicable to a case where more than one serving cells are configured. Further, the operations described in the present embodiment may be applicable to a case where more than five serving cells are configured. Herein, the case where more than one serving cell is configured may refer to a case where more than one but less than 5 serving cells are configured.

Figure 4:
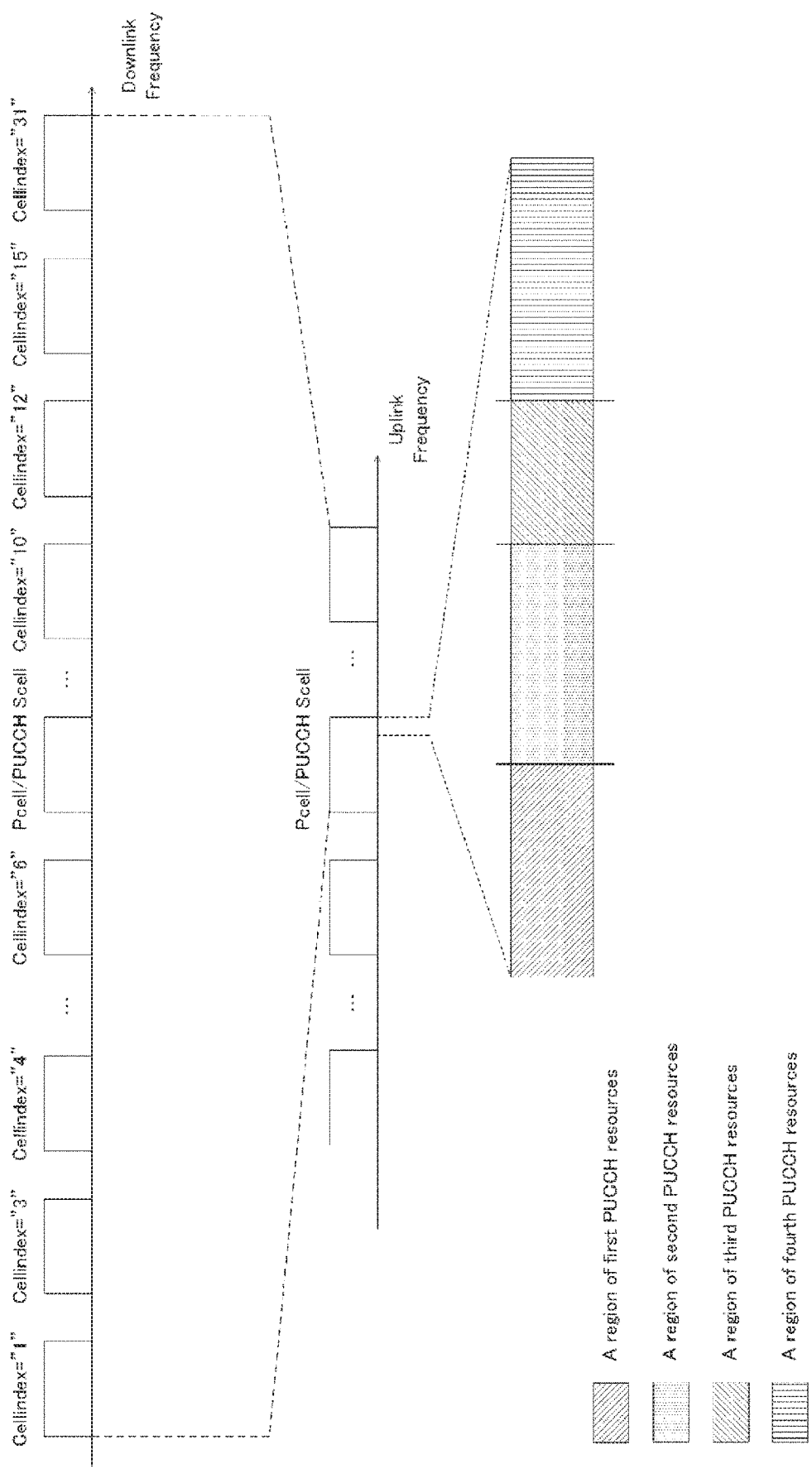
FIG. 4 is a diagram illustrating a method to transmit uplink control information according to the present embodiment.

FIG. 4 is a diagram illustrating a method to transmit uplink control information according to the present embodiment.

Hereinafter, a subframe in which PDCCH detection and PDSCH transmission (PDSCH decoding) based on the detection of the PDCCH are performed is also referred to as a first subframe. For example, the first subframe is represented as subframe n–4. Moreover, a subframe in which transmission of HARQ-ACK for PDSCH transmission (PDSCH decoding) is also referred to as a second subframe. For example, the second subframe is represented as subframe n.

For example, for the PDSCH transmission indicated by the detection of the PDCCH in the first subframe, the terminal device 1 may transmit the HARQ-ACK using the first PUCCH resource and/or the second PUCCH format in the second subframe. To be more specific, when HARQ-ACK is transmitted using the second PUCCH format by the terminal device 1, the first PUCCH resource may be used.

In addition, for the PDSCH transmission indicated by the detection of the PDCCH in the first subframe, the terminal device 1 may transmit the HARQ-ACK using the third PUCCH resource and/or the fourth PUCCH format in the second subframe. To be more specific, when HARQ-ACK is transmitted using the fourth PUCCH format by the terminal device 1, the third PUCCH resource may be used.

In addition, for the PDSCH transmission indicated by the detection of the PDCCH in the first subframe, the terminal device 1 may transmit the HARQ-ACK using the fourth PUCCH resource and/or the fifth PUCCH format in the second subframe. To be more specific, when HARQ-ACK is transmitted using the fifth PUCCH format by the terminal device 1, the fourth PUCCH resource may be used. Note that the first PUCCH resource, the third PUCCH resource, and the fourth PUCCH resource will be described later herein.

Here, for example, the terminal device 1 may use different PUCCH formats and/or different PUCCH resources for transmission of HARQ-ACK based on the serving cell(s) (and/or the cell index value(s) of the serving cell(s)) on which PDSCH transmission(s) is scheduled. In addition, the terminal device 1 may use different PUCCH formats and/or different PUCCH resources for transmission of HARQ-ACK based on the serving cell(s) (and/or the cell index value(s) of the serving cell(s)) on which PDSCH transmission(s) is scheduled and the number of bits (e.g., the total number of bits in a subframe corresponding to HAQ-ACK, SR, and/or CSI) of the uplink control information in the corresponding subframe.

Here, the cell index may include a secondary index (also referred to as a ScellIndex) associated with the identity used to identify the secondary cell. (The Information Element 'ScellIndex' concerns a short identity, used to identify an SCell.) Also, the cell index may include a serving cell index (also referred to as a ServCellIndex) associated with the identity used to identify the serving cell. (The Information Element 'ServCellIndex' concerns a short identity, used to identify a serving cell (i.e. the PCell or an Scell).)

Here, a value of "0" for the serving cell index may be applied to the primary cell. Also, the value of the allocated secondary cell index may be used as the value of the serving cell index applied to the secondary cell. In the following, the secondary cell index (ScellIndex) and/or the serving cell index (ServCellIndex) may also be referred to as a cell index.

Here, the base station device 3 may configure the cell index (cell index value) for the terminal device 1. For example, the base station device 3 may transmit a higher layer signaling that includes a cell index. The terminal device 1 may identify the cell index of the serving cell based on the cell index set by the base station device 3. In other words, the cell index may be an index in the higher layer (also referred to as an index in the RRC layer or an index of the RRC).

Herein, for the PDSCH transmission only on the primary cell, the terminal device 1 may transmit the HARQ-ACK using the second PUCCH format. That is, for the PDSCH transmission only on the serving cell with a cell index of "0" (ServCellIndex=0), the terminal device 1 may transmit the HARQ-ACK using the second PUCCH format.

In addition, for the PDSCH transmission only on the PUCCH secondary cell, the terminal device 1 may transmit HARQ-ACK using the second PUCCH format. Also, for the PDSCH transmission only on the PUCCH secondary cell, the terminal device 1 may transmit HARQ-ACK using a first PUCCH resource (hereinafter also referred to as a 1-1 PUCCH resource) configured by the higher layer (the HARQ-ACK may be transmitted using the 1-1 PUCCH resource and/or the second PUCCH format). For example, the base station device 3 may transmit the higher layer signaling including information that may be used to configure the 1-1 PUCCH resource.

To be more specific, for PDSCH transmission only on the PUCCH secondary cell, the terminal device 1 may transmit HARQ-ACK using a first PUCCH resource (1-1 PUCCH resource) that differs from the first PUCCH resource that is used for HARQ-ACK transmission for PDSCH transmission only on the primary cell.

Here, for example, the first PUCCH resource (the 1-1 PUCCH resource) that differs from the first PUCCH resource may refer to a PUCCH resource indicated (configured) to have a source index different from the resource index for the first PUCCH resource. In addition, the first PUCCH (the 1-1 PUCCH resource) resource that differs from the first PUCCH resource may refer to a PUCCH resource indicated (configured) to have an orthogonal sequence index different from the orthogonal sequence index for the first PUCCH resource. Also, the first PUCCH resource (the 1-1 PUCCH resource) that differs from the first PUCCH resource may refer to a PUCCH resource indicated (configured) to have a cyclic shift value different from the cyclic shift for the first PUCCH resource.

Further, for the PDSCH transmission only on the PUCCH secondary cell, the terminal device 1 may transmit the HARQ-ACK using the fourth PUCCH format. Also, for the PDSCH transmission only on the PUCCH secondary cell, the terminal device 1 may transmit the HARQ-ACK using the fifth PUCCH format. As described above, for example, the base station device 3 may configure(indicate), for the terminal device 1, which of the fourth PUCCH format or the fifth PUCCH format is to be used.

Further, for the PDSCH transmission on the secondary cell, the terminal device 1 may transmit the HARQ-ACK using the fourth PUCCH format. In other words, for the PDSCH transmission on at least one secondary cell, the terminal device 1 may transmit the HARQ-ACK using the fourth PUCCH format. Here, the secondary cell may include the PUCCH secondary cell. Also, the secondary cell may not include the PUCCH secondary cell. In other words, the secondary cell may include only the non-PUCCH secondary cell.

Further, for the PDSCH transmission on secondary cells, the terminal device 1 may transmit the HARQ-ACK using the fifth PUCCH format. In other words, based on the detection of PDSCH transmission on at least one secondary cell, the terminal device 1 may transmit the HARQ-ACK using the fifth PUCCH format. Here, the secondary cell may include the PUCCH secondary cell. Also, the secondary cell may not include the PUCCH secondary cell. In other words, the secondary cell may include only the non-PUCCH secondary cell.

Herein, for the PDSCH transmission(s) on the secondary cell(s) having a cell index less than or equal to a first predetermined value, the terminal device 1 may transmit the HARQ-ACK using the fourth PUCCH format. In other words, for the PDSCH transmission(s) on the secondary cell(s) having a cell index less than or equal to the first predetermined value indicated by the detection of PDCCH in a first subframe, the terminal device 1 may transmit the HARQ-ACK using the fourth PUCCH format in a second subframe.

In other words, for the PDSCH transmission(s) on the secondary cell(s) having a cell index value smaller than a second predetermined value, the terminal device 1 may transmit the HARQ-ACK using the fourth PUCCH format. In other words, for the PDSCH transmission(s) on the secondary cell(s) having a cell index value smaller than a second predetermined value indicated by the detection of PDCCH in a first subframe, the terminal device 1 may transmit the HARQ-ACK using the fourth PUCCH format in a second subframe.

Further, for the PDSCH transmission(s) on the secondary cell(s) having a cell index value greater than a first predetermined value, the terminal device 1 may transmit the HARQ-ACK using the fifth PUCCH format. In other words, for the PDSCH transmission(s) on the secondary cell(s) having a cell index value greater than a first predetermined value indicated by the detection of PDCCH in a first subframe, the terminal device 1 may transmit the HARQ-ACK using the fifth PUCCH format in a second subframe.

In other words, for the PDSCH transmission(s) on the secondary cell(s) having a cell index value greater than or equal to a second predetermined value, the terminal device 1 may transmit the HARQ-ACK using the fourth PUCCH format. In other words, for the PDSCH transmission(s) on the secondary cell(s) having a cell index greater than or equal to a second predetermined value indicated by the detection of PDCCH in a first subframe, the terminal device 1 may transmit the HARQ-ACK using the fourth PUCCH format.

Herein, for example, the "first predetermined value" (or the "second predetermined value") may be predetermined by the specification or the like, and may be a value known between the base station device 3 and the terminal device 1. Herein, the value of the cell index applied to the primary cell may not be included in the first predetermined value (or the second predetermined value). In other words, the first predetermined value (or the second predetermined value) may be any one of the cell index values set by the base station device 3 using the secondary cell index.

For example, the first predetermined value may be a value such as "4" or "9". For example, for the TDD, the first predetermined value may be "4". For example, for the FDD, the first predetermined value may be "9". As another example, for the TDD and the FDD, the first predetermined value may be "4".

The first predetermined value may be configured by the base station device 3. As an example, the base station device 3 may select the first predetermined value, and transmit information indicating the first predetermined value to the terminal device 1. Further, the second predetermined value may be configured by the base station device 3. As an example, the base station device 3 may select the second predetermined value, and transmit information indicating the second predetermined value to the terminal device 1. For example, the base station device 3 may transmit the higher layer signaling that includes information indicating the first predetermined value or the first predetermined value.

Also, for example, the first predetermined value may be the "fourth smallest (lowest) value" or the "ninth smallest value" among the cell indices configured by the base station device 3. In other words, the first predetermined value may be the "fourth value" or the "ninth value" in the case where the values of the cell indices configured by the base station device 3 are arranged in ascending order.

For example, for the TDD, the first predetermined value may be the "fourth value" in the case where the values of the cell indices configured by the base station device 3 are arranged in ascending order. In the same way, for the FDD, the first predetermined value may be the "ninth value" in the case where the values of the cell indices configured by the base station device 3 are arranged in ascending order. In addition, for the TDD and the FDD, the first predetermined value may be the "fourth value" in the case where the values of the cell indices configured by the base station device 3 are arranged in ascending order.

In the same way, for example, the second predetermined value may be a value such as "5" or "10". For example, for the TDD, the second predetermined value may be "5". Similarly, for the FDD, the second predetermined value may be "10". As another example, for the TDD and the FDD, the second predetermined value may be "10".

Also, for example, the second predetermined value may be the "fifth smallest (lowest) value" or the "tenth smallest value" among the cell indices configured by the base station device 3. In other words, the second predetermined value may be the "fifth value" or the "tenth value" in the case where the values of the cell indices configured by the base station device 3 are arranged in ascending order.

For example, for the TDD, the second predetermined value may be the "fifth value" in the case where the values of the cell indices configured by the base station device 3 are arranged in ascending order. In the same way, for the FDD, the second predetermined value may be the "tenth value" in the case where the values of the cell indices configured by the base station device 3 are arranged in ascending order starting. In addition, for the TDD and the FDD, the second predetermined value may be the "fifth value" in the case where the values of the cell indices configured by the base station device 3 are arranged in ascending order.

For example, in the case where values of "1", "3", "4", "6", "10", "12", "15", and "31" are configured as cell indices for each of the eight secondary cells by the base station device 3, the first predetermined value may be "6". In other words, in the case where cell index values configured by the base station device 3 are arranged in ascending order (that is, ordered as "1", "3", "4", "6", "10", "12", "15", and "31"), the fourth value is 6. Also, in this case, the second predetermined value is "10".

That is, in this case, for PDSCH transmission(s) on the secondary cell(s) with cell index values less than or equal to "6", the terminal device 1 may transmit the HARQ-ACK using the fourth PUCCH format. Further, for the PDSCH transmission(s) on the secondary cell(s) with cell index values greater than a "6", the terminal device 1 may transmit the HARQ-ACK using the fifth PUCCH format.

Herein, for the PDSCH transmission on the primary cell and the PDSCH transmission(s) on the secondary cell(s) with cell index values less than or equal to the first predetermined value that are indicated by the detection of two PDCCHs in a first subframe, the terminal device 1 may transmit the HARQ-ACK using the fourth PUCCH format in a second subframe.

In addition, for the PDSCH transmission(s) on the secondary cell(s) having a cell index value smaller than or equal to the first predetermined value and the PDSCH transmission(s) on the secondary cell(s) with cell index values less than or equal to the first predetermined value that are indicated by the detection of two PDCCHs in a first subframe, the terminal device 1 may transmit the HARQ-ACK using the fourth PUCCH format in a second subframe.

Also, for the PDSCH transmission on the primary cell and the PDSCH transmission(s) on the secondary cell(s) with cell index values greater than the first predetermined value that are indicated by the detection of two PDCCHs in a first subframe, the terminal device 1 may transmit the HARQ-ACK using the fifth PUCCH format in a second subframe.

Similarly, for the PDSCH transmission(s) on the secondary cell(s) with cell index values less than or equal to the first predetermined value and the PDSCH transmission(s) on the secondary cell(s) with cell index values greater than the first predetermined value that are indicated by the detection of two PDCCHs in a first subframe, the terminal device 1 may transmit the HARQ-ACK using the fifth PUCCH format in a second subframe.

Further, for the PDSCH transmission(s) on the secondary cell(s) with cell index values greater than the first predetermined value and the PDSCH transmission(s) on the secondary cell(s) with cell index values greater than the first predetermined value that are indicated by the detection of two PDCCHs in a first subframe, the terminal device 1 may transmit the HARQ-ACK using the fifth PUCCH format in a second subframe.

In other words, the terminal device 1 may transmit the HARQ-ACK using the fifth PUCCH format based on at least the detection of PDSCH transmission(s) on the secondary cell(s) with cell index values greater than the first determined value.

In addition, the terminal device 1 may transmit the HARQ-ACK using the fourth PUCCH format at least based on not detecting PDSCH transmission(s) on the secondary cell(s) with cell index values greater than the first predetermined value and detection of PDSCH transmission(s) on the secondary cell(s) with cell index values less than or equal to the first predetermined value.

Hereinafter, as described above, the terminal device 1 switching the fourth PUCCH format and the fifth PUCCH format to perform HARQ-ACK transmission based on the serving cell on which the PDSCH is scheduled is also described as the first behavior. Herein, in the case where both the fourth PUCCH format and the fifth PUCCH format are configured for transmission of the HARQ-ACK, the terminal device 1 may perform the first behavior.

That is, in the case where the fourth PUCCH format is not configured for transmission of the HARQ-ACK and the fifth PUCCH format is configured for transmission of the HARQ-ACK, the terminal device 1 may always transmit the HARQ-ACK using the fifth PUCCH format. Hereinafter, performing transmission of the HARQ-ACK always using the fifth PUCCH format will be described as the second behavior.

The base station device 3 may configure the terminal device 1 to perform either the first behavior or the second behavior. For example, the base station device 3 may transmit the higher layer signaling including information to be used to configure to perform the first behavior and/or to perform the second behavior. The terminal device 1 may perform the first behavior or the second behavior based on the information used to configure to perform the first behavior and/or to perform the second behavior.

FIG. 5 is a diagram illustrating a predetermined value (such as the first predetermined value or the second predetermined value) according to the present embodiment. FIG. 5 illustrates one example of processing for a case where values of "1", "3", "4", "6", "10", "12", "15", and "31" are configured by the base station device 3 as cell indices for each of the eight secondary cells. The predetermined values (such as the first predetermined value and the second predetermined value) of FIG. 4 may also be described with reference to FIG. 5.

Herein, in FIG. 5, a serving cell with a cell index value of "0" may correspond to the primary cell. Herein, in FIG. 5, it is illustrated that a downlink transmission mode supporting up to two transport blocks may be configured for the primary cell.

Also, in FIG. 5, it is illustrated that, for each of the serving cells with a cell index of "3", "6", or "12", a downlink transmission mode that supports up to two transport blocks may be configured. Further, it is illustrated that, for each of the serving cells with a cell index of "1", "4", "10", "15", or "31", a downlink transmission mode that supports one transport block may be configured.

When the terminal device 1 transmits the HARQ-ACK, HARQ-ACK bits for different serving cells may be concatenated and a concatenated bit sequence may be generated. Here, as described above, the number of HARQ-ACK bits (bit sequence for a HARQ-ACK) may be determined based on at least the number of configured serving cells and the downlink transmission mode configured for each serving cell (each of the configured serving cells).

As illustrated in FIG. 5, for example, HARQ-ACK bits may be concatenated in ascending order of cell index value, and the first predetermined value may be the maximum value (e.g., "10") of the cell index such that the number of concatenated bits does not exceed a third predetermined value (e.g., 10 bits). In other words, HARQ-ACK bits may be concatenated in ascending order of cell index value, and the first predetermined value may be a cell index value (e.g., "10") when the number of concatenated bits is the maximum value (e.g., 9 bits) that does not exceed a third predetermined value (e.g., 10 bits).

Also, the first predetermined value may be a value that satisfies at least the following conditions (maximum value, maximum value of the cell index). Herein, the condition may specify that the HARQ-ACK bits are sequentially concatenated starting from a cell index of "0" up to the cell index of the first predetermined value, and the number of concatenated HARQ-ACK bits does not exceed a third predetermined value (e.g., 10 bits).

Also, as illustrated in FIG. 5, for example, HARQ-ACK bits may be concatenated in ascending order of cell index value, and the second predetermined value may be the minimum value (e.g., "12") of the cell index when the number of concatenated bits exceeds a third predetermined value (e.g., 10 bits). In other words, HARQ-ACK bits may be concatenated in ascending order of cell index value, and the second predetermined value may be the value of the cell index (e.g., "12") when the number of concatenated HARQ-ACK bits is the minimum value (e.g., 11 bits) that exceeds the third predetermined value (e.g., 10 bits).

Also, the second predetermined value may be a value that satisfies at least the following conditions (minimum value, minimum value of the cell index). Herein, the condition may specify that the HARQ-ACK bits are sequentially concatenated starting from a cell index of "0" up to the cell index of the second predetermined value, and the number of concatenated HARQ-ACK bits exceeds a third predetermined value (e.g., 10 bits).

Herein, for example, the third predetermined value may be a value defined by the specification or the like and be known between the base station device 3 and the terminal device 1. For example, the third predetermined value may be "10", "20", or "21". For example, for FDD or FDD-TDD primary cell frame structure type 1, the third predetermined value may be 10. Also, for TDD, the third predetermined value may be "20". Also, for FDD or FDD-TDD primary cell frame structure type 2, the third predetermined value may be "21".

In addition, the third predetermined value may be "11", "21", or "22". For example, for FDD or FDD-TDD primary cell frame structure type 1, the third predetermined value may be "11". Also, for TDD, the third predetermined value may be "21". Also, for FDD or FDD-TDD primary cell frame structure type 2, the third predetermined value may be "22".

That is, the third predetermined value may be determined based on the number of HARQ-ACK bits supported by the PUCCH format 3 described above (defined for the PUCCH format 3). The third predetermined value may also be determined based on the number of HARQ-ACK bits supported by the PUCCH format 3 described above (defined for the PUCCH format 3) as well as the number of SR bits.

Here, in a case where cell groups (e.g., a master cell group, a secondary cell group) associated with dual connectivity are configured, the terminal device 1 may use the first PUCCH resource and the second PUCCH format for the PDSCH transmission only on the primary secondary cell indicated by the detection of the PDCCH in the first subframe. In the present embodiment, the secondary cell does not include a primary secondary cell. The master cell group may include one or multiple PUCCH cell groups. The secondary cell group may include one or multiple PUCCH cell groups.

In the case where cell groups associated with dual connectivity are configured, the terminal device 1 may use the third PUCCH resource and the fourth PUCCH format, or the fourth PUCCH resource and the fifth PUCCH format, for the PDSCH transmission only on the secondary cell (the PUCCH secondary cell and/or the non-PUCCH secondary cell) indicated by the detection of the PDCCH in the first subframe.

Here, in the dual connectivity, the terminal device 1 may (simultaneously) connect to a master eNB (MeNB) and a secondary eNB (SeNB). In a case where the dual connectivity is configured, two MAC entities may be configured for the terminal device 1. Here, one of the two MAC entities may indicate a MAC entity for the master cell group. The other of the two MAC entities may indicate a MAC entity for the secondary cell group. In a case where the dual connectivity is not configured, one MAC entity may be configured for the terminal device 1.

FIG. 6 is a diagram illustrating a method to process uplink control information according to the present embodiment. Here, FIG. 6 illustrates a processing method to be used when the uplink control information (e.g., HARQ-ACK) is transmitted using the fourth PUCCH format. Also, FIG. 6 illustrates a processing method to be used when the uplink control information (e.g., HARQ-ACK) is transmitted using the fifth PUCCH format.

As illustrated in FIG. 6, for example, the HARQ-ACK bit sequence, which is a result of concatenating HARQ-ACK bits for different serving cells, may be composed by sequentially concatenating cell index values in ascending order until the number of serving cells configured by the higher layer is reached. Herein, the serving cells configured by the higher layer may include the primary cell. For example, when "0" is configured as the cell index for the primary cell, and "1", "3", "4", "6", "10", "12", "15", and "31" are provided as the cell indices for each of the eight secondary cells, the HARQ-ACK bit sequence may be concatenated in the order "0", "1", "3", "4", "6", "10", "12", "15", "31".

Furthermore, in the processing for each serving cell, the HARQ-ACK bit sequence may be concatenated based on the downlink transmission mode. For example, when a downlink transmission mode that supports one transport block is configured for a particular cell, a 1-bit HARQ-ACK bit may be concatenated. Also, when a downlink transmission mode that supports two transport blocks is configured for a particular cell, a 2-bit HARQ-ACK bits may be concatenated.

That is, the terminal device 1 may use the fourth PUCCH format to transmit a HARQ-ACK bit sequence (or HARQ-ACK) provided based on the processing illustrated in FIG. 6. That is, the terminal device 1 may use the fifth PUCCH format to transmit a HARQ-ACK bit sequence (or a HARQ-ACK) provided based on the processing illustrated in FIG. 6.

FIG. 7 is a diagram illustrating a method to process uplink control information according to the present embodiment. Here, FIG. 7 illustrates a processing method to be used when the uplink control information (e.g., HARQ-ACK) is transmitted using the fourth PUCCH format.

As illustrated in FIG. 7, for example, the HARQ-ACK bit sequence, which is a result of concatenating HARQ-ACK bits for different serving cells, may be composed by sequentially concatenating cell index values in ascending order. Herein, the HARQ-ACK bit sequence may be formed by comparing the number of serving cells configured by the higher layer and a fourth predetermined value, and concatenating up to the smaller value. For example, in a case where the number of serving cells configured by the higher layer is 24 and the fourth predetermined value is 5, the HARQ-ACK bit sequence may be concatenated up to 5. That is, in this case, the HARQ-ACK bit sequence is concatenated from the smallest (lowest) cell index value up to the fifth value.

Here, the fourth predefined value may be a value defined by the specification or the like, and may be known between the base station device 3 and the terminal device 1. For example, the fourth predetermined value may be a value such as "5" or "10". For the TDD, the fourth predetermined value may be "5". For example, for the FDD, the fourth predetermined value may be "10". For example, for the TDD and the FDD, the fourth predetermined value may be "5".

Furthermore, in the processing for each serving cell, the HARQ-ACK bit sequence may be concatenated based on the downlink transmission mode. For example, when a downlink transmission mode that supports one transport block is configured for a particular cell, a 1-bit HARQ-ACK bit may be concatenated. Also, when a downlink transmission mode that supports two transport blocks is configured for a particular cell, a 2-bit HARQ-ACK bits may be concatenated.

That is, the terminal device 1 may use the fourth PUCCH format to transmit a HARQ-ACK bit sequence (or a HARQ-ACK) provided based on the processing illustrated in FIG. 7.

FIG. 8 is a diagram illustrating a method to process uplink control information according to the present embodiment. Here, FIG. 8 illustrates a processing method to be used when the uplink control information (e.g., HARQ-ACK) is transmitted using the fourth PUCCH format.

As illustrated in FIG. 8, for example, the HARQ-ACK bit sequence, which is a result of concatenating HARQ-ACK bits for different serving cells, may be composed by sequentially concatenating cell index values in ascending order. Herein, the HARQ-ACK bit sequence may be formed by concatenating up to a fifth predetermined value.

Here, the fifth predefined value may be a value defined by the specification or the like, and may be known between the base station device 3 and the terminal device 1. For example, the fifth predetermined value may be "11", "21", or "22". For example, for FDD or FDD-TDD primary cell frame structure type 1, the fifth predetermined value may be "11". Also, for TDD, the third predetermined value may be "21". Also, for FDD or FDD-TDD primary cell frame structure type 2, the third predetermined value may be "22".

In addition, the fifth predetermined value may be "12", "22", or "23". For example, for FDD or FDD-TDD primary cell frame structure type 1, the third predetermined value may be "12". Also, for TDD, the third predetermined value may be "22". Also, for FDD or FDD-TDD primary cell frame structure type 2, the third predetermined value may be "23".

That is, the fifth predetermined value may correspond to the third predetermined value. For example, the fifth predetermined value may be the third predetermined value plus 1. Herein, the third predetermined value is as described above.

Furthermore, in the processing for each serving cell, the HARQ-ACK bit sequence may be concatenated based on the downlink transmission mode. For example, when a downlink transmission mode that supports one transport block is configured for a particular cell, a 1-bit HARQ-ACK bit may be concatenated. Also, when a downlink transmission mode that supports two transport blocks is configured for a particular cell, a 2-bit HARQ-ACK bits may be concatenated.

Herein, in a case where the terminal device 1 does not detect PDSCH or PDCCH instructing release of a downlink SPS (Semi-Persistent Scheduling) in a particular subframe for a particular serving cell (i.e., in a case that neither PDSCH nor PDCCH is detected), a NACK may be generated for the particular serving cell. For example, the terminal device 1 may generate a single NACK for serving cells for which a downlink transmission mode supporting one transport block is configured, and two NACKs may be generated for serving cells for which a downlink transmission mode supporting up to two transport blocks is configured.

That is, the terminal device 1 may use the fourth PUCCH format to transmit a HARQ-ACK bit sequence (or a HARQ-ACK) provided based on the processing illustrated in FIG. 8.

Figure 9:
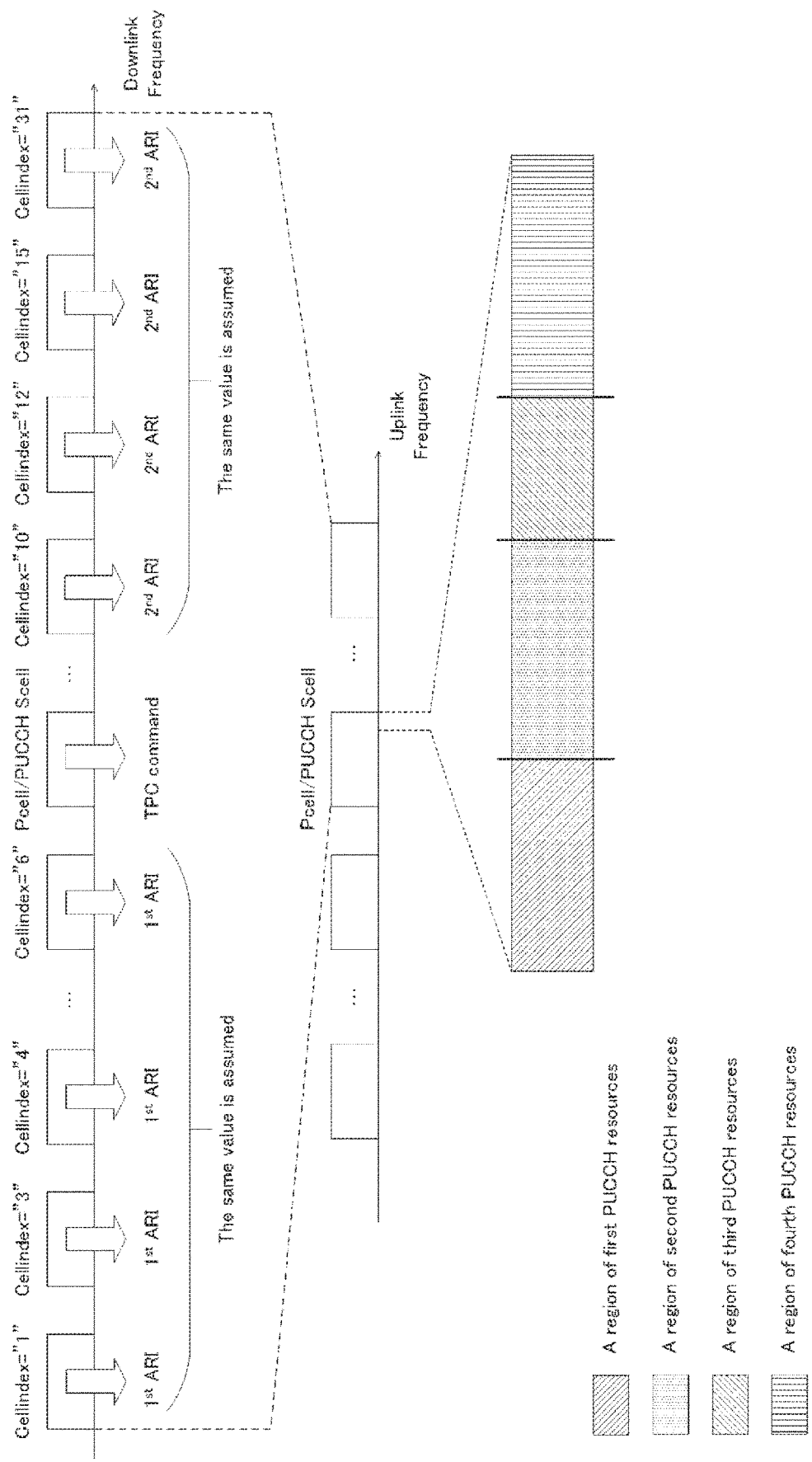
FIG. 9 is a diagram illustrating a method for allocating PUCCH resources according to the present embodiment.

FIG. 9 is a diagram illustrating a method for allocating PUCCH resources according to the present embodiment.

Here, the base station device 3 may instruct (configure, allocate) a PUCCH resource for the terminal device 31. Here, the PUCCH resource may include a first PUCCH resource (also referred to as n(1)PUCCH), a second PUCCH resource (also referred to as n(2)PUCCH), a third PUCCH resource (also referred to as n(3)PUCCH), and a fourth PUCCH resource (also referred to as n(4)PUCCH).

For example, the base station device 3 may transmit the higher layer signaling including first information to be used to configure the first PUCCH resource. For example, SR may be transmitted with the first PUCCH resource. The base station device 3 may transmit the higher layer signaling including second information to be used to indicate periodicity and/or offset for transmission of SR. The terminal device 1 may transmit SR in accordance with a configuration made by the base station device 3. To be more specific, the terminal device 1 may transmit SR using the first PUCCH resource and the first PUCCH format.

The base station device 3 may indicate the first PUCCH resource through the higher layer signaling and the PDCCH. For example, the base station device 3 may transmit the higher layer signaling including third information to be used to configure the first PUCCH resource. For example, HARQ-ACK corresponding to the second PUCCH format may be transmitted with the first PUCCH resource. The terminal device 1 may determine the first PUCCH resource on the basis of the control channel element (CCE) used for the transmission of the PDCCH (e.g., the lowest index of the CCE) and the third information. The terminal device 1 may use the first PUCCH resource for the transmission of HARQ-ACK corresponding to the second PUCCH format. To be more specific, the terminal device 1 may transmit HARQ-ACK using the first PUCCH resource and/or the second PUCCH format.

The base station device 3 may transmit the higher layer signaling including fourth information to be used to configure the second PUCCH resource. For example, CSI (e.g., periodic CSI) may be transmitted with the second PUCCH resource. Here, the second PUCCH resource may be configured for each of the serving cells. In other words, CSI (e.g., CSI) may be reported for each of the serving cells. The base station device 3 may transmit the higher layer signaling including fifth information to be used to indicate periodicity and/or offset for a periodic CSI report. The terminal device 1 may periodically report CSI in accordance with a configuration made by the base station device 3. To be more specific, the terminal device 1 may report periodic CSI using the second PUCCH resource and/or the third PUCCH format.

The base station device 3 may indicate the third PUCCH resource through the higher layer signaling and the PDCCH (or downlink control information transmitted on the PDCCH). For example, the base station device 3 may use a higher layer signaling to transmit a set of sixth information for setting a plurality of values related to the third PUCCH resource, and may indicate the third resource by indicating one value of the plurality of values based on the value (also referred to as $1^{st}$ ARI; $1^{st}$ ACK Resource Indicator) set in the field of the downlink control information transmitted on the PDCCH.

For example, the base station device 3 may use the higher layer signaling to transmit the set of the sixth information for configuring four values corresponding to the four third PUCCH resources Further, by indicating one value out of the four values based on the value (e.g., the "00", "01", "10", "11" set in the 2 bit field of information) set in the field of the downlink control information transmitted on the PDCCH, the base station device 3 may indicate one of the third resources corresponding to the indicated value. That is, based on one value corresponding to the value set in the field of the downlink control information from among the four values corresponding to the four third PUCCH resources, the terminal device 1 may determine one of the third PUCCH resources that corresponds to the indicated value.

For example, the base station device 3 may indicate a third PUCCH resource based on a value set in a transmit power command field (hereafter, also referred to as a TPC command field) for the PUCCH included in a downlink assignment transmitted on the PDCCH for a secondary cell. That is, based on the value set in the TPC command field included in the downlink assignment used to instruct PDSCH transmission on the secondary cell, a single value corresponding to one of the single third PUCCH resources may be indicated.

Herein, the TPC command field included in the downlink assignment for the primary cell (that is, the downlink assignment used for instructing PDSCH transmission on the primary cell) may be used as a transmit power command for transmission on the PUCCH. Also, the TPC command field included in the downlink assignment for the PUCCH secondary cell (that is, the downlink assignment used for instructing PDSCH transmission in PUCCH secondary cell) may be used as a transmit power command for transmission on the PUCCH.

Here, the base station device 3 may indicate a third PUCCH resource based on the value set in the TPC command field included in the downlink assignment for a secondary cell with a cell index value smaller than or equal to the first predetermined value (or a secondary cell with a cell index less than the second predetermined value).

That is, one value corresponding to one of the third PUCCH resources may be indicated based on the value set in the TPC command field included in the downlink assignment to be used to instruct PDSCH transmission on a secondary cell with a cell index value smaller than or equal to the first predetermined value (or a secondary cell with a cell index with a value smaller than the second predetermined value).

In other words, a first ARI used to indicate the third PUCCH resource may be included in the downlink assignment(s) for the secondary cell(s) with a cell index value smaller than or equal to the first predetermined value (or the secondary cell(s) with a cell index value smaller than the second predetermined value).

Herein, in the case where a plurality of PDSCH transmissions on a plurality of secondary cells with cell index values less than or equal to the first predetermined value (or a plurality of secondary cells with cell index values less than the second predetermined value) is instructed using a plurality of downlink assignments in a particular subframe, the base station device 3 may set the same value as the value of the first ARI.

Also, in the case where a plurality of PDSCH transmissions in a plurality of secondary cells with cell index values less than or equal to the first predetermined value (or a plurality of secondary cells with cell index values less than the second predetermined value) is instructed using a plurality of downlink assignments in a particular subframe, it may be assumed that the same value is set as the value of the first ARI for the terminal device 1.

That is, the same value corresponding to one of the third PUCCH resources may be transmitted (it may be assumed that it is transmitted) in a particular subframe in each of the downlink assignments for secondary cells with cell index values less than or equal to the first predetermined value (or secondary cells with cell index values less than the second predetermined value).

That is, the value for the same third PUCCH resource may be transmitted (it may be assumed that it is transmitted) in a particular subframe in each of the downlink assignments for secondary cells with cell index values less than or equal to the first predetermined value (or secondary cells with cell index values less than the second predetermined value).

For example, as described above, in the case where values of "1", "3", "4", "6", "10", "12", "15", and "31" are set as cell indices for each of the eight secondary cells by the base station device 3, the first predetermined value may be "6". Also, the second predetermined value may be "10".

That is, in the case where values of "1", "3", "4", "6", "10", "12", "15", and "31" are configured as cell indices for each of the eight secondary cells, the terminal device 1 may determine the third PUCCH resource based on the value set in the TPC command field included in the downlink assignment(s) for the secondary cell(s) with cell index values of less than or equal to "6". Also, in this case, the terminal device 1 may determine the third PUCCH resources based on the value set in the TPC command field included in the downlink assignment(s) for the secondary cell(s) with cell index values less than "10".

In addition, in this case, the same value may be set to each of the TPC command fields included in the plurality of downlink assignments for the plurality of secondary cells with cell index values of less than or equal to "6" transmitted in a particular subframe. Furthermore, the same value may be set to each of the TPC command fields included in the plurality of downlink assignments for the plurality of secondary cells with cell index values of less than "10" in a particular subframe.

The base station device 3 may configure the fourth PUCCH resource through the higher layer signaling and/or the PDCCH (or downlink control information transmitted on the PDCCH). For example, the base station device 3 may transmit the higher layer signaling including seventh information to be used to configure the fourth PUCCH resource. The base station device 3 may indicate the fourth PUCCH resource in association with the PDCCH. The terminal device 1 may determine the fourth PUCCH resource in accordance with the PDCCH. The base station device 3 may transmit, on the PDCCH, downlink control information to be used to indicate the fourth PUCCH resource.

For example, the base station device 3 may configure the fourth PUCCH resource through the higher layer signaling and the PDCCH (or downlink control information transmitted on the PDCCH). For example, the base station device 3 may use the higher layer signaling to transmit a set of eighth information for configuring a plurality of values related to the fourth PUCCH resource, and may indicate the fourth resource by designating one value of the plurality of values based on the value (also referred to as $2^{nd}$ ARI; $2^{nd}$ ACK Resource Indicator) set in the field of the downlink control information transmitted on the PDCCH.

For example, the base station device 3 may use the higher layer signaling to transmit the set of the eighth information for configuring four values corresponding to the four fourth PUCCH resources. Further, by indicating one value out of the four values based on the value (e.g., the "00", "01", "10", "11" set in the 2 bit field of information) set in the field of the downlink control information transmitted on the PDCCH, the base station device 3 may indicate one of the fourth resources corresponding to the indicated value. That is, based on one value corresponding to the value set in the field of the downlink control information from among the four values corresponding to the four fourth PUCCH resources, the terminal device 1 may determine one of the fourth PUCCH resources that corresponds to the indicated value.

For example, the base station device 3 may indicate one of the fourth PUCCH resources based on the value set in the TPC command field included in the downlink assignment transmitted on the PDCCH for the secondary cell. That is, a value corresponding to one of the fourth PUCCH resources may be indicated based on the value set in the TPC command field included in the downlink assignment to be used to instruct PDSCH transmission on the secondary cell.

Here, the base station device 3 may indicate the fourth PUCCH resource based on the value set in the TPC command field(s) included in the downlink assignment(s) for the secondary cell(s) with a cell index value greater than the first predetermined value (or the secondary cell(s) with a cell index less than or equal to the second predetermined value).

That is, one value corresponding to one of fourth PUCCH resources may be indicated based on the value set in the TPC command field(s) included in the downlink assignment(s) to be used to instruct PDSCH transmission(s) on the secondary cell(s) with a cell index value greater than the first predetermined value (or the secondary cell(s) with a cell index with a value smaller than or equal to the second predetermined value).

In other words, a second ARI used to indicate the fourth PUCCH resource may be included in the downlink assignment(s) for the secondary cell(s) with a cell index value greater than the first predetermined value (or the secondary cell(s) with a cell index value smaller than or equal to the second predetermined value).

Herein, in the case where a plurality of PDSCH transmissions in a plurality of secondary cells with cell index values greater than the first predetermined value (or a plurality of secondary cells with cell index values less than or equal to the second predetermined value) is instructed using a plurality of downlink assignments in a particular subframe, the base station device 3 may set the same value as the value of the second ARI.

Also, in the case where a plurality of PDSCH transmissions in a plurality of secondary cells with cell index values greater than the first predetermined value (or a plurality of secondary cells with cell index values greater than or equal to the second predetermined value) is instructed using a plurality of downlink assignments in a particular subframe, it may be assumed that the same value is set as the value of the second ARI for the terminal device 1.

That is, the same value corresponding to one of the fourth PUCCH resources may be transmitted (it may be assumed that it is transmitted) in a particular subframe in each of the downlink assignments for secondary cells with cell index values greater than the first predetermined value (or secondary cells with cell index values greater than or equal to the second predetermined value).

That is, the value corresponding to the same fourth PUCCH resource may be transmitted (it may be assumed that it is transmitted) in a particular subframe in each of the downlink assignments for secondary cells with cell index values greater than the first predetermined value (or secondary cells with cell index values greater than or equal to the second predetermined value).

For example, as described above, in the case where values of "1", "3", "4", "6", "10", "12", "15", and "31" are configured as cell indices for each of the eight secondary cells by the base station device 3, the first predetermined value may be "6". Also, the second predetermined value may be "10".

That is, in the case where values of "1", "3", "4", "6", "10", "12", "15", and "31" are configured as cell indices for each of the eight secondary cells, the terminal device 1 may determine the fourth PUCCH resource based on the value set in the TPC command field(s) included in the downlink assignment(s) for the secondary cell(s) with cell index values greater than "6". Further, in this case, the terminal device 1 may determine the fourth PUCCH resource based on the value set in the TPC command field(s) included in the downlink assignment(s) for the secondary cell(s) with cell index values less than or equal to "10".

In addition, in this case, the same value may be set to each of the TPC command fields included in the plurality of downlink assignments for the plurality of secondary cells with cell index values greater than "6" transmitted in a particular subframe. Furthermore, the same value may be set to each of the TPC command fields included in the plurality of downlink assignments for the plurality of secondary cells with cell index values of less than "10" in a particular subframe.

Here, as described above, the base station device 3 may configure the terminal device 1 to perform either the first behavior or the second behavior. For example, when the base station device 3 configures the first behavior for the terminal device 1, the first ARI and the second ARI may be transmitted as described above. Also, when the base station device 3 configures the second behavior for the terminal device 1, only the second ARI may be transmitted.

The base station device 3 may, when configuring to perform the first behavior for the terminal device 1, indicate a third PUCCH resource based on the value set in the TPC command field(s) included in the downlink assignment(s) for the secondary cell(s) with cell index values less than or equal to the first predetermined value, and indicate the fourth PUCCH resource based on the value set in the TPC command field(s) included in the downlink assignment(s) for the secondary cell(s) with cell index values greater than the first predetermined value.

That is, the base station device 3 may, when configuring to perform the first behavior for the terminal device 1, indicate the third PUCCH resource based on the value set in the TPC command field(s) included in the downlink assignment(s) for the secondary cell(s) with cell index values less than the second predetermined value, and indicate the fourth PUCCH resource based on the value set in the TPC command field(s) included in the downlink assignment(s) for the secondary cell(s) with cell index values greater than or equal to the second predetermined value.

Here, the base station device 3 may, when configuring to perform the second behavior for the terminal device 1, indicate the fourth PUCCH resource based on the value set in the TPC command field(s) included in the downlink assignment(s) for the secondary cell(s) (the secondary cell(s) with a cell index value smaller than or equal to the first predetermined value or the secondary cell(s) with a cell index value greater than the first predetermined value).

The base station device 3 may, when configuring to perform the second behavior for the terminal device 1, indicate the fourth PUCCH resource based on both the value in the TPC command field(s) included in the downlink assignment(s) for the secondary cell(s) with cell index values less than or equal to the first predetermined value and the value in the TPC command field(s) included in the downlink assignment(s) for the secondary cell(s) with cell index values greater than the first predetermined value.

The base station device 3 may, when configuring to perform the second behavior for the terminal device 1, indicate the fourth PUCCH resource based on both the value in the TPC command field(s) included in the downlink assignment(s) for the secondary cell(s) with cell index values less than the second predetermined value and the value in the TPC command field(s) included in the downlink assignment(s) for the secondary cell(s) with cell index values greater than or equal to the second predetermined value.

In the case where, when configuring to perform the second behavior for the terminal device 1, a plurality of PDSCH transmissions in one or more secondary cells with cell index values less than or equal to the first predetermined value and/or secondary cells with cell index values greater than the first predetermined value is instructed using a plurality of downlink assignments in a particular subframe, the base station device 3 may set the same value as the value of the second ARI.

In the case where, when configuring to perform the second behavior for the terminal device 1, a plurality of PDSCH transmissions in one or more secondary cells with cell index values less than the second predetermined value and/or secondary cells with cell index values greater than or equal to the second predetermined value is instructed using a plurality of downlink assignments in a particular subframe, the base station device 3 may set the same value as the value of the second ARI.

Also, in the case where, a plurality of PDSCH transmissions in one or more secondary cells with cell index values less than or equal to the first predetermined value and/or secondary cells with cell index values greater than the first predetermined value is instructed using a plurality of downlink assignments in a particular subframe, it may be assumed that the same value is set as the value of the second ARI for the terminal device 1 configured for the second operation.

In the case where a plurality of PDSCH transmissions in one or more secondary cells with cell index values less than the second predetermined value and/or secondary cells with cell index values greater than or equal to the second predetermined value is instructed using a plurality of downlink assignments in a particular subframe, it may be assumed that the same value is set as the value of the second ARI for the terminal device 1 configured for the second operation.

That is, the value for the same fourth PUCCH resource may be transmitted (it may be assumed that it is transmitted) in a particular subframe in each of the downlink assignments for secondary cells with cell index values less than or equal to the first predetermined value and/or secondary cells with cell index values greater than the first predetermined value.

That is, the value corresponding to the same fourth PUCCH resource may be transmitted (it may be assumed that it is transmitted) in a particular subframe in each of the downlink assignments for secondary cells with cell index values less than the second predetermined and/or secondary cells with cell index values greater than or equal to the second predetermined value.

In addition, the base station device 3 may transmit a set of ninth information, to be used to indicate the fourth PUCCH resource, included in the above-described single command (or MAC control element) used to activate or deactivate a serving cell. The base station device 3 may transmit a second ARI, to be used to indicate the fourth PUCCH resource, included in the above-described single command (or MAC control element) used to activate or deactivate a serving cell. That is, for example, the base station device 3 may indicate the fourth PUCCH resource through the single command used to activate or deactivate at least a PUCCH secondary cell.

The terminal device 1 may determine the fourth PUCCH resource in accordance with the set of the ninth information (or the second ARI) included in the single command (or MAC control element) used to activate or deactivate a serving cell. Here, the terminal device 1 may transmit, on the PUSCH and/or the PUCCH, HARQ-ACK for downlink data (PDSCH transmission) including the single command to be used to indicate the fourth PUCCH resource. For example, the terminal device 1 may transmit HARQ-ACK at least for downlink data (PDSCH transmission) including the single command to be used to activate or deactivate the PUCCH secondary cell. Here, the terminal device 1 does not need to transmit HARQ-ACK for downlink data (PDSCH transmission) including a single command to be used to activate or deactivate a secondary cell not including a PUCCH secondary cell.

Simultaneous transmission of HARQ-ACK and CSI will be described below.

Here, as described above, the terminal device 1 may simultaneously transmit HARQ-ACK and CSI using the third PUCCH format, the fourth PUCCH format, and/or the fifth PUCCH format. Here, for example, the base station device 3 can transmit the higher layer signaling including tenth information used to allow simultaneous transmission of HARQ-ACK and CSI (simultaneousAckNackAndCQI). Here, the tenth information may be used to allow simultaneous transmission of HARQ-ACK and CSI in the third PUCCH format.

The base station device 3 can transmit the higher layer signaling including eleventh information used to allow simultaneous transmission of HARQ-ACK and CSI (simultaneousAckNackAndCQI-Format3) using the fourth PUCCH format. Also, the base station device 3 can transmit the higher layer signaling including twelfth information used to allow simultaneous transmission of HARQ-ACK and CSI (simultaneousAckNackAndCQI-Format4) using the fifth PUCCH format.

For example, the base station device 3 may transmit, to the terminal device 1, the tenth information, the eleventh information, and/or the twelfth information for each of the PUCCH cell groups through the higher layer signaling. Also, the terminal device 1 may receive, from the base station device 3, the tenth information, the eleventh information, and/or the twelfth information for each of the PUCCH cell groups through the higher layer signaling.

In addition, the base station device 3 may transmit, to the terminal device 1, information common to multiple PUCCH cell groups (the tenth information, the eleventh information, and/or the twelfth information) through the higher layer signaling. Also, the terminal device 1 may receive, from the base station device 3, information common to multiple PUCCH cell groups (the tenth information, the eleventh information, and/or the twelfth information) through the higher layer signaling.

The base station device 3 may transmit, to the terminal device 1, the tenth information, the eleventh information, and/or the twelfth information for each of the PUCCH serving cells through the higher layer signaling. The terminal device 1 may receive, from the base station device 3, the tenth information, the eleventh information, and/or the twelfth information for each of the PUCCH serving cells through the higher layer signaling.

Also, the base station device 3 may transmit, to the terminal device 1, information common to multiple PUCCH serving cells (the tenth information, the eleventh information, and/or the twelfth information) through the higher layer signaling. In addition, the terminal device 1 may receive, from the base station device 3, information common to multiple PUCCH serving cells (the tenth information, the eleventh information, and/or the twelfth information) through the higher layer signaling.

The base station device 3 may transmit, to the terminal device 1, the tenth information, the eleventh information, and/or the twelfth information for each of the master cell group and the secondary cell group through the higher layer signaling. Also, the terminal device 1 may receive, from the base station device 3, the tenth information, the eleventh information, and/or the twelfth information for each of the master cell group and the secondary cell group through the higher layer signaling.

Hereinafter, the behavior of the terminal device 1 in the case where the HARQ-ACK collides with the CSI report (e.g., periodic CSI) in the same subframe without any PUSCH will be described.

For example, based on the condition that simultaneous transmission of the HARQ-ACK and CSI is allowed on the basis of the tenth information, the terminal device 1 may report the CSI multiplexed with the HARQ-ACK on the PUCCH using the third PUCCH format. Here, HARQ-ACK and CSI may be transmitted simultaneously with the second PUCCH resource. Also in this case, one serving cell may be configured for the terminal device 1.

Further, based on the conditions that simultaneous transmission of the HARQ-ACK and CSI is allowed on the basis of the tenth information and that the HARQ-ACK corresponds to PDSCH transmission only on the primary cell, the terminal device 1 may report the CSI multiplexed with the HARQ-ACK on the PUCCH using the third PUCCH format. Here, HARQ-ACK and CSI may be transmitted simultaneously with the second PUCCH resource. Also in this case, more than one serving cell may be configured for the terminal device 1.

Also, based on the conditions that simultaneous transmission of the HARQ-ACK and CSI is allowed on the basis of the tenth information and that the HARQ-ACK corresponds to PDSCH transmission only on the PUCCH secondary cell, the terminal device 1 may report the CSI multiplexed with the HARQ-ACK on the PUCCH using the third PUCCH format. Here, HARQ-ACK and CSI may be transmitted simultaneously with the second PUCCH resource. Also in this case, more than one serving cell may be configured for the terminal device 1.

Here, in order to transmit the HARQ-ACK and CSI for PDSCH transmission only on the PUCCH secondary cell, the terminal device 1 may use a second PUCCH resource (hereafter, also referred to as a 2-1 PUCCH resource) configured by the higher layer. For example, the base station device 3 may transmit the higher layer signaling that includes information used to configure the 2-1 PUCCH resource.

To be more specific, the terminal device 1 may transmit HARQ-ACK and CSI for PDSCH transmission only on the PUCCH secondary cell, with a second PUCCH resource (the 2-1 PUCCH resource) different from the second PUCCH resource used for the transmission of HARQ-ACK and CSI for PDSCH transmission only on the primary cell.

Here, for example, the second PUCCH resource (the 2-1 PUCCH resource) different from the second PUCCH resource may refer to a PUCCH resource designated (configured) with a resource index different from the resource index of the second PUCCH resource. In addition, the second PUCCH resource (the 2-1 PUCCH resource) that differs from the second PUCCH resource may refer to a PUCCH resource designated (set) with an orthogonal sequence index different from the orthogonal sequence index for the second PUCCH resource. Also, the second PUCCH resource (the 2-1 PUCCH resource) that differs from the second PUCCH resource may refer to a PUCCH resource designated (set) with a cyclic shift value different from the cyclic shift for the second PUCCH resource.

Also, based on the conditions that simultaneous transmission of the HARQ-ACK and CSI is allowed on the basis of the eleventh information and that the HARQ-ACK corresponds to PDSCH transmission only on the PUCCH secondary cell, the terminal device 1 may report the CSI multiplexed with the HARQ-ACK on the PUCCH using the fourth PUCCH format. Here, HARQ-ACK and CSI may be transmitted simultaneously with the third PUCCH resource. Also in this case, more than one serving cell may be configured for the terminal device 1. Also in this case, more than five serving cells may be configured for the terminal device 1. Also, in this case, the fourth PUCCH format may be configured for the terminal device 1.

Also, based on the conditions that simultaneous transmission of the HARQ-ACK and CSI is allowed on the basis of the twelfth information and that the HARQ-ACK corresponds to PDSCH transmission only on the PUCCH secondary cell, the terminal device 1 may report the CSI multiplexed with the HARQ-ACK on the PUCCH using the fifth PUCCH format. Here, HARQ-ACK and CSI may be transmitted simultaneously with the fourth PUCCH resource. Also in this case, more than one serving cell may be configured for the terminal device 1. Also in this case, more than five serving cells may be configured for the terminal device 1. Also, in this case, the fifth PUCCH format may be configured for the terminal device 1.

Further, based on the conditions that simultaneous transmission of the HARQ-ACK and CSI is allowed on the basis of the eleventh information and that the HARQ-ACK corresponds to PDSCH transmission on the secondary cell, the terminal device 1 may report the CSI multiplexed with the HARQ-ACK on the PUCCH using the fourth PUCCH format. In this case, more than one serving cell may be configured for the terminal device 1. Also in this case, more than five serving cells may be configured for the terminal device 1. Also, in this case, the fourth PUCCH format may be configured for the terminal device 1.

For example, in this case, the terminal device 1 may report CSI multiplexed with HARQ-ACK on the PUCCH using the fourth PUCCH format under the condition that the total number of bits corresponding to the uplink control information (HARQ-ACK, SR, and/or CSI) in the subframe is not greater than or equal to a predetermined value (e.g., 22 bits). Here, HARQ-ACK and CSI may be transmitted simultaneously with the third PUCCH resource.

Further, based on the conditions that simultaneous transmission of the HARQ-ACK and CSI is allowed on the basis of the twelfth information and that the HARQ-ACK corresponds to PDSCH transmission on the secondary cell, the terminal device 1 may report the CSI multiplexed with the HARQ-ACK on the PUCCH using the fifth PUCCH format.

In this case, more than one serving cell may be configured for the terminal device 1. Also in this case, more than five serving cells may be configured for the terminal device 1. Also, in this case, the fifth PUCCH format may be configured for the terminal device 1.

For example, in this case, the terminal device 1 may report CSI multiplexed with HARQ-ACK on the PUCCH using the fifth PUCCH format under the condition that the total number of bits corresponding to the uplink control information in the subframe is not greater than or equal to a predetermined value (e.g., the number of bits transmitted in the fifth PUCCH format). Here, HARQ-ACK and CSI may be transmitted simultaneously with the fourth PUCCH resource.

Here, based at least on the conditions that simultaneous transmission of the HARQ-ACK and the CSI is allowed and that the HARQ-ACK corresponds to PDSCH transmission(s) on the secondary cell(s) with a cell index value smaller than or equal to the first predetermined value, the terminal device 1 may report the CSI multiplexed with the HARQ-ACK using the fourth PUCCH format. Here, HARQ-ACK and CSI may be transmitted simultaneously with the third PUCCH resource.

That is, based at least on the conditions that simultaneous transmission of the HARQ-ACK and the CSI is allowed and that the HARQ-ACK corresponds to PDSCH transmission(s) on the secondary cell(s) with a cell index value smaller than the second predetermined value, the terminal device 1 may report the CSI multiplexed with the HARQ-ACK using the fourth PUCCH format. Here, HARQ-ACK and CSI may be transmitted simultaneously with the third PUCCH resource.

In this case, more than one serving cell may be configured for the terminal device 1. Also in this case, more than five serving cells may be configured for the terminal device 1. In addition, in this case, simultaneous transmission of HARQ-ACK and CSI may be allowed based on the eleventh information and/or the twelfth information. Note that this only applies in the case where simultaneous transmission of HARQ-ACK and CSI is allowed based on both the eleventh information and the twelfth information. In other words, in the case where simultaneous transmission of the HARQ-ACK and CSI is allowed based on the twelfth information, but simultaneous transmission of the HARQ-ACK and CSI is not allowed based on the eleventh information, the CSI multiplexed with the HARQ-ACK on the PUCCH may always be reported using the fifth PUCCH format.

Also, in this case, the fourth PUCCH format may be configured for the terminal device 1. Also in this case, the fifth PUCCH format may be configured for the terminal device 1. Note that this only applies in the case where both the fourth PUCCH format and the fifth PUCCH format are configured. In other words, in the case where the fifth PUCCH format is set, but the fourth PUCCH format is not set, the CSI multiplexed with the HARQ-ACK on the PUCCH may always be reported using the fifth PUCCH format.

In addition, based at least on the conditions that simultaneous transmission of the HARQ-ACK and the CSI is allowed and that the HARQ-ACK corresponds to PDSCH transmission(s) on the secondary cell(s) with a cell index greater than the first predetermined value, the terminal device 1 may report the CSI multiplexed with the HARQ-ACK using the fifth PUCCH format. Here, HARQ-ACK and CSI may be transmitted simultaneously with the fourth PUCCH resource.

That is, based at least on the conditions that simultaneous transmission of the HARQ-ACK and the CSI is allowed and that the HARQ-ACK corresponds to PDSCH transmission(s) on the secondary cell(s) with a cell index less than or equal to the second predetermined value, the terminal device 1 may report the CSI multiplexed with the HARQ-ACK using the fifth PUCCH format. Here, HARQ-ACK and CSI may be transmitted simultaneously with the fourth PUCCH resource.

In this case, more than one serving cell may be configured for the terminal device 1.

Also in this case, more than five serving cells may be configured for the terminal device 1. Also, in this case, simultaneous transmission of the HARQ-ACK and the CSI may be allowed based on the twelfth information. Also, in this case, the fifth PUCCH format may be configured for the terminal device 1.

Herein, in cases in which the above described conditions are not satisfied, the CSI may be dropped and the HARQ-ACK may be transmitted alone. That is, based on at least one of the tenth information, the eleventh information, the twelfth information, and/or the above described conditions, the terminal device 1 may drop the CSI and transmit only the HARQ-ACK.

With respect to the present embodiment, although an example in which values of "1", "3", "4", "6", "10", "12", "15", and "31" are set as cell indices for each of the eight secondary cells was described, the above description may be applied to other configurations as well.

Embodiments of the present invention relating to a method and processing operations for transmission of uplink control information have been described in detail above with reference to the drawings, but specific configurations are not limited to the above embodiments and may include, for example, modifications to the above design that fall within the scope that does not depart from the spirit of the present invention. Furthermore, with respect to the present embodiment, embodiments obtained by suitably combining the above-described methods and processes are also included in the technical scope of the present invention.

Configurations of devices according to the present embodiment will be described below.

Figure 10:
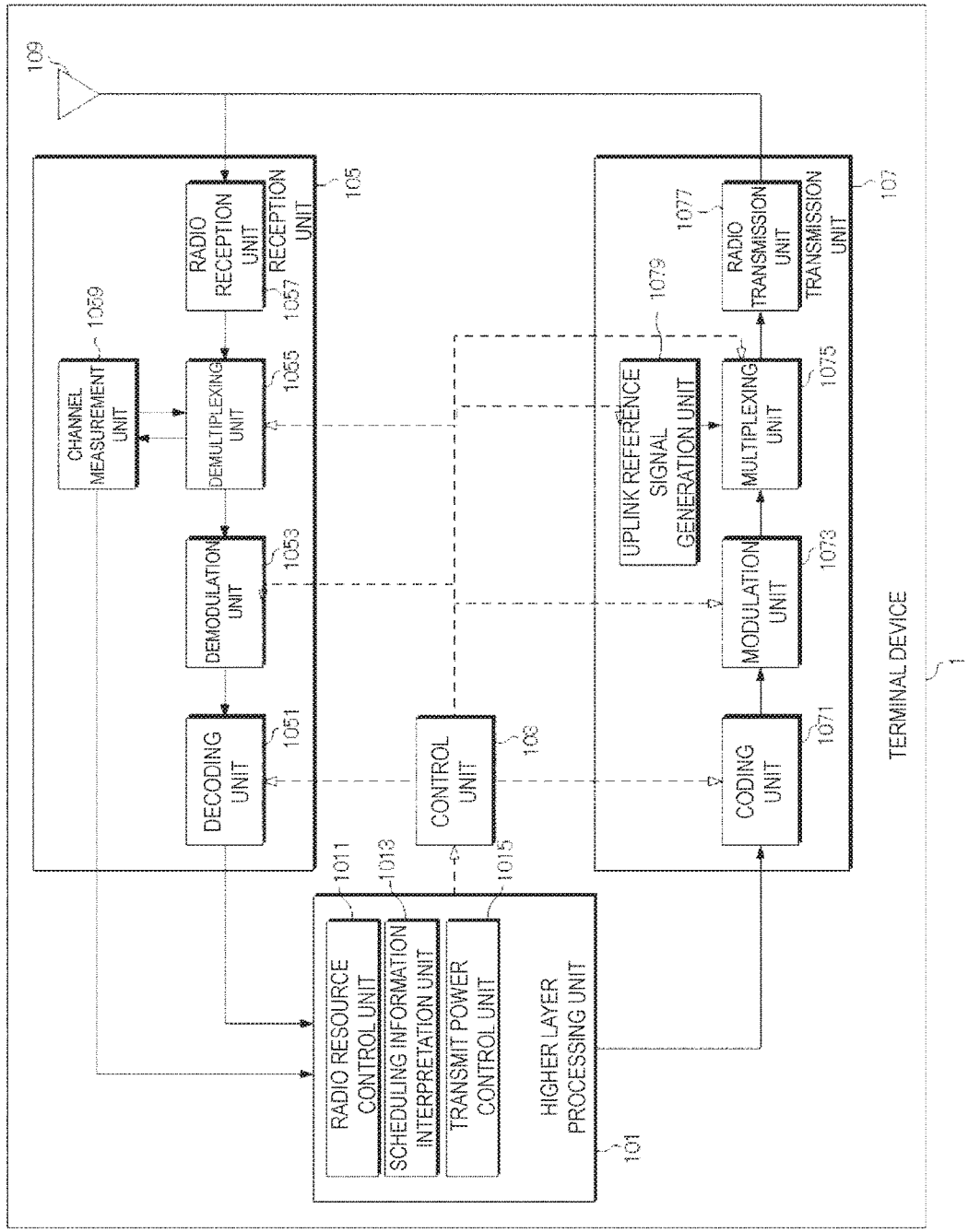
FIG. 10 is a schematic block diagram illustrating a configuration of a terminal device 1 according to the present embodiment.

FIG. 10 is a schematic block diagram illustrating a configuration of a terminal device 1 according to the present embodiment. As illustrated in the figure, the terminal device 1 is configured, including a higher layer processing unit 101, a control unit 103, a reception unit 105, a transmission unit 107, and a transmit and receive antenna 109. The higher layer processing unit 101 is configured, including a radio resource control unit 1011, a scheduling information interpretation unit 1013, and a transmit power control unit 1015. The reception unit 105 is configured, including a decoding unit 1051, a demodulation unit 1053, a demultiplexing unit 1055, a radio reception unit 1057, and a channel measurement unit 1059. The transmission unit 107 is configured, including a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. Also, the higher layer processing unit 101 may perform processing of the medium access control (MAC) layer, the packet data convergence protocol (PDCP) layer, the radio link control (RLC) layer, and the radio resource control (RRC) layer.

The radio resource control unit 1011 included in the higher layer processing unit 101 manages various configuration information/parameters of the terminal device 1 itself. The radio resource control unit 1011 sets the various configuration information/parameters in accordance with higher layer signaling received from the base station device 3. To be more specific, the radio resource control unit 1011 sets the various configuration information/parameters in accordance with the information indicating the various configuration information/parameters received from the base station device 3. Furthermore, the radio resource control unit 1011 generates information to be mapped to each uplink channel, and outputs the generated information to the transmission unit 107. The radio resource control unit 1011 is also referred to as a configuration unit 1011.

Here, the scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

The transmit power control unit 1015 included in the higher layer processing unit 101 controls the transmit power for transmission on the PUSCH and the PUCCH in accordance with various configuration information/parameters managed by the radio resource control unit 1011, a TPC command, and the like.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and receive antenna 109, and outputs the information resulting from the decoding, to the higher layer processing unit 101.

The radio reception unit 1057 converts (down-converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a cyclic prefix (CP) from the digital signal resulting from the conversion, performs fast Fourier transform (FFT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. Moreover, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a binary phase shift keying (BPSK) modulation scheme, and outputs a result of the demodulation to the decoding unit 1051. The decoding unit 1051 decodes the PHICH destined for the terminal device 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as quadrature phase shift keying (QPSK), 16 quadrature amplitude modulation (QAM), or 64 QAM, and outputs a result of the demodulation to the decoding unit 1051. The decoding unit 1051 decodes the data in accordance with information on a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and receive antenna 109. Furthermore, the transmission unit 107 transmits uplink control information.

The coding unit 1071 performs coding, such as convolutional coding or block coding, on the uplink control information input from the higher layer processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme prescribed in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through multiple input multiple output spatial multiplexing (MIMO SM), and performs precoding on the sequences.

The uplink reference signal generation unit 1079 generates a sequence acquired in accordance with a rule (formula) prescribed in advance, on the basis of a physical layer cell identifier (also referred to as a physical cell identity (PCI), a cell ID, or the like) for identifying the base station device 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 may rearrange modulation symbols of the PUSCH in parallel and then perform discrete Fourier transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs inverse fast Fourier transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 109 for transmission.

Figure 11:
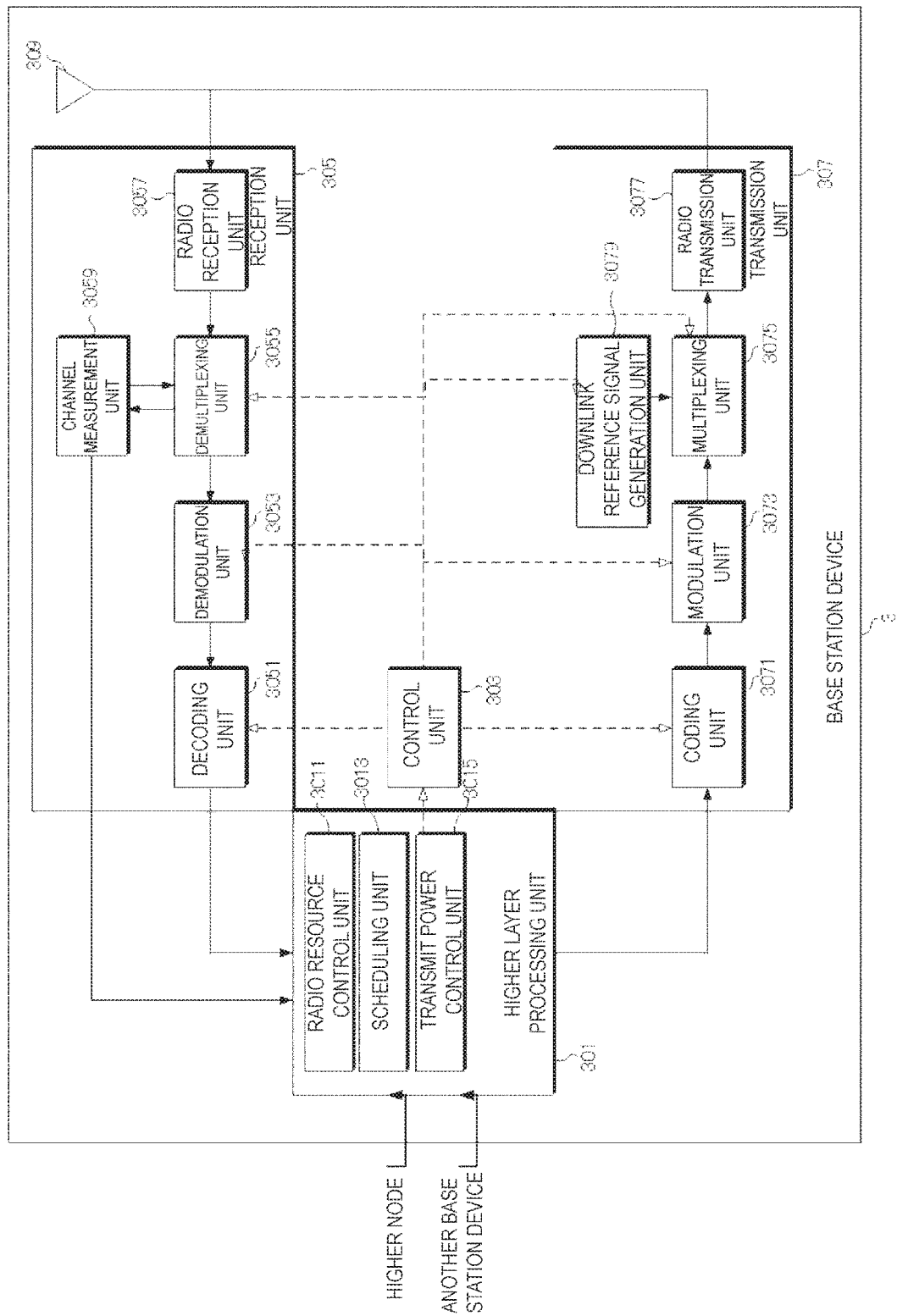
FIG. 11 is a schematic block diagram illustrating a configuration of a base station device 3 according to the present embodiment.

FIG. 11 is a schematic block diagram illustrating a configuration of a base station device 3 according to the present embodiment. As illustrated in the figure, the base station device 3 is configured, including a higher layer processing unit 301, a control unit 303, a reception unit 305, a transmission unit 307, and a transmit and receive antenna 309. The higher layer processing unit 301 is configured, including a radio resource control unit 3011, a scheduling unit 3013, and a transmit power control unit 3015. The reception unit 305 is configured, including a decoding unit 3051, a demodulation unit 3053, a demultiplexing unit 3055, a radio reception unit 3057, and a channel measurement unit 3059. The transmission unit 307 is configured, including a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, system information, the RRC message, the MAC control element (CE), and the like, and outputs a result of the generation or the acquirement to the transmission unit 307. Furthermore, the radio resource control unit 3011 manages various configuration information/parameters for each of the terminal devices 1. The radio resource control unit 3011 may configure various configuration information/parameters for each of the terminal devices 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (the PDSCH and the PUSCH) are allocated, the coding rate and modulation scheme for the physical channels (the PDSCH and the PUSCH), the transmit power, and the like, from the received channel state information and from the channel estimate, channel quality, or the like input from the channel measurement unit 3059. The scheduling unit 3013 generates the control information (e.g., the DCI format) in order to control the reception unit 305 and the transmission unit 307 in accordance with a result of the scheduling, and outputs the generated information to the control unit 303. The scheduling unit 3013 further determines timing of performing transmission processing and reception processing.

The transmit power control unit 3015 included in the higher layer processing unit 301 controls the transmit power for transmission on the PUSCH and the PUCCH performed by the terminal device 1, in accordance with various configuration information/parameters managed by the radio resource control unit 3011, a TPC command, and the like.

In accordance with the control information originating from the higher layer processing unit 301, the control unit 303 generates a control signal for control of the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and receive antenna 309, and outputs information resulting from the decoding to the higher layer processing unit 301. The radio reception unit 3057 converts (down-converts) an uplink signal received through the transmit and receive antenna 309 into a baseband signal through orthogonal demodulation, removes unnecessary frequency components, controls the amplification level in such a manner as to suitably maintain a signal level, performs orthogonal demodulation on the basis of an in-phase component and an orthogonal component of the received signal, and converts the resulting orthogonally-demodulated analog signal into a digital signal. The reception unit 305 receives uplink control information.

The radio reception unit 3057 removes a portion corresponding to a cyclic prefix (CP) from the digital signal resulting from the conversion. The radio reception unit 3057 performs fast Fourier transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed on the basis of radio resource allocation information that is determined in advance by the base station device 3 using the radio resource control unit 3011 and that is included in the uplink grant notified to each of the terminal devices 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs inverse discrete Fourier transform (IDFT) on the PUSCH, acquires modulation symbols, and performs reception signal demodulation, that is, demodulates each of the modulation symbols on the PUCCH and the PUSCH, in compliance with the modulation scheme prescribed in advance, such as binary phase shift keying (BPSK), QPSK, 16 QAM, or 64 QAM, or in compliance with the modulation scheme that the base station device 3 itself notified in advance with the uplink grant to each of the terminal devices 1. The demodulation unit 3053 demultiplexes the modulation symbols of multiple pieces of uplink data transmitted on the same PUSCH with the MIMO SM, on the basis of the number of spatial-multiplexed sequences notified in advance with the uplink grant to each of the terminal devices 1 and information designating the precoding to be performed on the sequences.

The decoding unit 3051 decodes the coded bits of the PUCCH and the PUSCH, which have been demodulated, at the coding rate in compliance with a coding scheme prescribed in advance, the coding rate being prescribed in advance or being notified in advance with the uplink grant to the terminal device 1 by the base station device 3 itself, and outputs the decoded uplink data and uplink control information to the higher layer processing unit 101. In a case where the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, on the basis of the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal device 1 through the transmit and receive antenna 309.

The coding unit 3071 codes the HARQ indicator, the downlink control information, and the downlink data that are input from the higher layer processing unit 301, in compliance with the coding scheme prescribed in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme prescribed in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal device 1 and that is acquired in accordance with a rule prescribed in advance on the basis of the physical layer cell identifier (PCI) for identifying the base station device 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmission unit 3077 performs inverse fast Fourier transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 309 for transmission.

More particularly, the terminal device 1 according to the present embodiment may include a transmission unit 107 configured to transmit, with respect to PDSCH transmission on a secondary cell on a secondary cell having a cell index less than or equal to a first predetermined value, a HARQ-ACK using a first PUCCH resource and a PUCCH format 3, and transmit, with respect to PDSCH transmission on a secondary cell on a secondary cell having a cell index greater than the first predetermined value, a HARQ-ACK using a second PUCCH resource and a PUCCH format 4.

Herein, the first predetermined value may be a value of a fourth cell index when values of a set of cell indices set by a base station device are arranged in ascending order, the first PUCCH resource for transmission of the HARQ-ACK using the PUCCH format 3 may be designated based on at least a value set in an information field included in a downlink assignment for a secondary cell having a cell index less than or equal to the first predetermined value, and the second PUCCH resource for transmission of the HARQ-ACK using the PUCCH format 4 may be designated based on at least a value set in an information field included in a downlink assignment for a secondary cell having a cell index greater than the first predetermined value.

Also, the terminal device 1 according to the present embodiment, may include a transmission unit configured to transmit, with respect to PDSCH transmission on a secondary cell on a secondary cell having a cell index less than or equal to a first predetermined value, a HARQ-ACK using a first PUCCH resource and a PUCCH format 3, and transmit, with respect to PDSCH transmission on a secondary cell on a secondary cell having a cell index greater than the first predetermined value, a HARQ-ACK using a second PUCCH resource and a PUCCH format 4.

Herein, the first predetermined value may be a maximum cell index value with a bit sequence of 10 or less obtained by sequentially concatenating HARQ-ACK bits corresponding to the primary cell up to HARQ-ACK bits corresponding to a serving cell with a cell index of the first predetermined value, the first PUCCH resource for transmission of the HARQ-ACK using the PUCCH format 3 may be designated based on at least a value set in an information field included in a downlink assignment for a secondary cell having a cell index less than or equal to the first predetermined value, and the second PUCCH resource for transmission of the HARQ-ACK using the PUCCH format 4 may be designated based on at least a value set in an information field included in a downlink assignment for a secondary cell having a cell index greater than the first predetermined value.

Also, the first PUCCH resource may be designated based on a value set in an information field included in a downlink assignment for a secondary cell with a cell index less than or equal to the first predetermined value from four first PUCCH resources set by a higher layer, and the second PUCCH resource may be designated based on a value set in an information field included in a downlink assignment for a secondary cell with a cell index greater than the first predetermined value from the four second PUCCH resources set by the higher layer.

Also, a value designating an identical first PUCCH resource may be set for each information field included in a plurality of downlink assignments for a plurality of secondary cells with cell indices less than or equal to the first predetermined value in a particular subframe, and a value designating an identical second PUCCH resource may be set for each information field included in a plurality of downlink links for a plurality of secondary cells with cell indices greater than the first predetermined value in a particular subframe.

In addition, the base station device 3 according to the present embodiment may include a reception unit 305 configured to receive, with respect to PDSCH transmission on a secondary cell on a secondary cell having a cell index less than or equal to a first predetermined value, a HARQ-ACK using a first PUCCH resource and a PUCCH format 3, and receive, with respect to PDSCH transmission on a secondary cell on a secondary cell having a cell index greater than the first predetermined value, a HARQ-ACK using a second PUCCH resource and a PUCCH format 4.

Herein, the first predetermined value may be a value of a fourth cell index when values of a set of cell indices set for a terminal device are arranged in ascending order, the first PUCCH resource for transmission of the HARQ-ACK using the PUCCH format 3 may be designated based on at least a value set in an information field included in a downlink assignment for a secondary cell having a cell index less than or equal to the first predetermined value, and the second PUCCH resource for transmission of the HARQ-ACK using the PUCCH format 4 may be designated based on at least a value set in an information field included in a downlink assignment for a secondary cell having a cell index greater than the first predetermined value.

In addition, the base station device 3 according to the present embodiment may include a reception unit 305 configured to receive, with respect to PDSCH transmission on a secondary cell on a secondary cell having a cell index less than or equal to a first predetermined value, a HARQ-ACK using a first PUCCH resource and a PUCCH format 3, and receive, with respect to PDSCH transmission on a secondary cell on a secondary cell having a cell index greater than the first predetermined value, a HARQ-ACK using a second PUCCH resource and a PUCCH format 4.

Herein, the first predetermined value may be a maximum cell index value with a bit sequence of 10 or less obtained by sequentially concatenating HARQ-ACK bits corresponding to the primary cell up to HARQ-ACK bits corresponding to a serving cell with a cell index for the first predetermined value, the first PUCCH resource for transmission of the HARQ-ACK using the PUCCH format 3 may be designated based on at least a value set in an information field included in a downlink assignment for a secondary cell having a cell index less than or equal to the first predetermined value, and the second PUCCH resource for transmission of the HARQ-ACK using the PUCCH format 4 may be designated based on at least a value set in an information field included in a downlink assignment for a secondary cell having a cell index greater than the first predetermined value.

Also, the first PUCCH resource may be designated based on a value set in an information field included in a downlink assignment for a secondary cell with a cell index less than or equal to the first predetermined value from four first PUCCH resources set by a higher layer, and the second PUCCH resource may be designated based on a value set in an information field included in a downlink assignment for a secondary cell with a cell index greater than the first predetermined value from the four second PUCCH resources set by the higher layer.

Also, a value designating an identical first PUCCH resource may be set for each information field included in a plurality of downlink assignments for a plurality of secondary cells with cell indices less than or equal to the first predetermined value in a particular subframe, and a value designating an identical second PUCCH resource may be set for each information field included in a plurality of download links for a plurality of secondary cells with cell indices greater than the first predetermined value in a particular subframe.

In addition, the terminal device 1 of the present embodiment may include a reception unit 105 configured to receive both a first set of information used for permitting simultaneous transmission of a CSI and a HARQ-ACK using PUCCH format 3, as well as a second set of information used for permitting simultaneous transmission of a CSI and a HARQ-ACK using PUCCH format 4. The terminal device 1 may also include a transmission unit 107 for transmitting a HARQ-ACK and/or a CSI, and wherein any of the following processing operations (1) to (4) are executed based at least on whether the first set of information, the second set of information, and the HARQ-ACK correspond to a PDSCH transmission on a secondary cell with a cell index less than or equal to a first predetermined value or whether the HARQ-ACK corresponds to a PDSCH transmission on a secondary cell with a cell index greater than the first predetermined value.

Herein, processing operation (1) refers to an operation in which the CSI multiplexed with the HRQ-ACK is transmitted with the first PUCCH resource using the PUCCH format 3, processing operation (2) refers to an operation in which the CSI multiplexed with the HARQ-ACK is transmitted with the second PUCCH resource using the PUCCH format 4, processing operation (3) refers to an operation in which the HARQ-ACK is transmitted with a first PUCCH resource using the PUCCH format 3 and the CSI is dropped, and processing operation (4) refers to an operation in which the HARQ-ACK is transmitted with a second PUCCH resource using the PUCCH format 4 and the CSI is dropped.

Also, the first PUCCH resource may be designated based on a value set in an information field included in a downlink assignment for a secondary cell with a cell index less than or equal to the first predetermined value from four first PUCCH resources set by a higher layer, and the second PUCCH resource may be designated based on a value set in an information field included in a downlink assignment for a secondary cell with a cell index greater than the first predetermined value from the four second PUCCH resources set by the higher layer.

Also, a value designating an identical first PUCCH resource may be set for each information field included in a plurality of downlink assignments for a plurality of secondary cells with cell indices less than or equal to the first predetermined value in a particular subframe, and a value designating an identical second PUCCH resource may be set for each information field included in a plurality of download links for a plurality of secondary cells with cell indices greater than the first predetermined value in a particular subframe.

In addition, the base station device 3 of the present embodiment may include a transmission unit 307 configured to transmit both a first set of information used for permitting simultaneous transmission of a CSI and a HARQ-ACK using PUCCH format 3, as well as a second set of information used for permitting simultaneous transmission of a CSI and a HARQ-ACK using PUCCH format 4. The base station device 3 may also include a reception unit 305 for receiving a HARQ-ACK and/or a CSI, and wherein any of the following processing operations (1) to (4) are executed based at least on whether the first set of information, the second set of information, and the HARQ-ACK correspond to a PDSCH transmission on a secondary cell with a cell index less than or equal to a first predetermined value or whether the HARQ-ACK corresponds to a PDSCH transmission on a secondary cell with a cell index greater than the first predetermined value.

Herein, processing operation (1) refers to an operation in which the CSI multiplexed with the HRQ-ACK is transmitted with the first PUCCH resource using the PUCCH format 3, processing operation (2) refers to an operation in which the CSI multiplexed with the HARQ-ACK is transmitted with the second PUCCH resource using the PUCCH format 4, processing operation (3) refers to an operation in which the HARQ-ACK is transmitted with a first PUCCH resource using the PUCCH format 3 and the CSI is dropped, and processing operation (4) refers to an operation in which the HARQ-ACK is transmitted with a second PUCCH resource using the PUCCH format 4 and the CSI is dropped.

Also, the first PUCCH resource may be designated based on a value set in an information field included in a downlink assignment for a secondary cell with a cell index less than or equal to the first predetermined value from four first PUCCH resources set by a higher layer, and the second PUCCH resource may be designated based on a value set in an information field included in a downlink assignment for a secondary cell with a cell index greater than the first predetermined value from the four second PUCCH resources set by the higher layer.

Also, a value designating an identical first PUCCH resource may be set for each information field included in a plurality of downlink assignments for a plurality of secondary cells with cell indices less than or equal to the first predetermined value in a particular subframe, and a value designating an identical second PUCCH resource may be set for each information field included in a plurality of download links for a plurality of secondary cells with cell indices greater than the first predetermined value in a particular subframe.

According to the present invention, uplink control information can be efficiently transmitted.

A program running on each of the base station device 3 and the terminal device 1 according to the present invention may be a program that controls a central processing unit (CPU) and the like (a program for causing a computer to operate) in such a manner as to realize the functions according to the above-described embodiment of the present invention. The information handled in these devices is temporarily stored in a random access memory (RAM) while being processed. Thereafter, the information is stored in various types of read only memory (ROM) such as a flash ROM and a hard disk drive (HDD) and when necessary, is read by the CPU to be modified or rewritten.

Moreover, the terminal device 1 and the base station device 3 according to the above-described embodiment may be partially realized by a computer. This configuration may be realized by recording a program for realizing such control functions on a computer-readable recording medium and causing a computer system to read the program recorded on the recording medium for execution.

Moreover, the "computer system" here is defined as a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the program may implement some of the functions described above, and also may be capable of implementing the functions described above in combination with a program already stored in the computer system.

Furthermore, the base station device 3 according to the above-described embodiment can be realized as an aggregation (a device group) constituted of multiple devices. Devices constituting the device group may be each provided with some or all portions of each function or each functional block of the base station device 3 according to the above-described embodiment. It is only required that the device group itself include general functions or general functional blocks of the base station device 3. Furthermore, the terminal device 1 according to the above-described embodiments can communicate with the base station device as an assembly.

Furthermore, the base station device 3 according to the above-described embodiment may be an Evolved Universal Terrestrial Radio Access Network (EUTRAN). Furthermore, the base station device 3 according to the above-described embodiment may have some or all portions of the function of a node higher than an eNodeB.

Furthermore, some or all portions of each of the terminal device 1 and the base station device 3 according to the above-described embodiment may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, the circuit integration technique is not limited to the LSI, and the integrated circuit may be implemented with a dedicated circuit or a general-purpose processor. Furthermore, if with advances in semiconductor technology, a circuit integration technology with which an LSI is replaced appears, it is also possible to use an integrated circuit based on the technology.

Furthermore, according to the above-described embodiment, the terminal device is described as one example of a communication device, but the present invention is not limited to this, and can be applied to a fixed-type or a stationary-type electronic apparatus installed indoors or outdoors, for example, a terminal device or a communication device, such as an audio-video (AV) apparatus, a kitchen apparatus, a cleaning or washing machine, an air-conditioning apparatus, office equipment, a vending machine, and other household apparatuses.

The embodiment of the present invention has been described in detail above referring to the drawings, but the specific configuration is not limited to the embodiment and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiment is also included in the technical scope of the present invention.

INDUSTRIAL APPLICABILITY

The present invention can be applied to mobile phones, personal computers, tablet computers, and the like.

REFERENCE SIGNS LIST

1 (1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 Transmit power control unit
3011 Radio resource control unit
3013 Scheduling unit
3015 Transmit power control unit

The invention claimed is:

1. A terminal device which communicates with a first base station device using a first serving cell group (CG) and with a second base station device using a second serving CG,
    each of the first serving CG and the second serving CG includes a physical uplink control channel (PUCCH) serving cell and at least one non-PUCCH serving cell,
    the PUCCH serving cell is a serving cell used for a PUCCH,
    the non-PUCCH serving cell is a serving cell not used for the PUCCH,
    the terminal device comprising:
    receiving circuitry configured to receive, for each of the first serving CG and the second serving CG:
    a radio resource control (RRC) message including i) either one of first information or second information, and ii) at least one of third information and fourth information, the first information indicating a first behavior, the second information indicating a second behavior, the third information regarding a first PUCCH resource configuration, and the fourth information regarding a second PUCCH resource configuration, and
    a downlink control information (DCI) format for scheduling a physical downlink shared channel (PDSCH), the DCI format including a transmission power command (TPC) for the PUCCH; and
    transmitting circuitry configured to transmit, on the PUCCH for each of the first serving CG and the second serving CG, hybrid automatic repeat request-acknowledgment (HARQ-ACK) for a PDSCH transmission on the non-PUCCH serving cell, the PDSCH transmission on the non-PUCCH serving cell being indicated by a detection of a physical downlink control channel (PDCCH), wherein
    a) in a case that the RRC message includes the first information, the transmitting circuitry is configured to perform the first behavior in which:

the transmitting circuitry determines a first PUCCH resource based on the TPC and the third information, and transmits the HARQ-ACK using the first PUCCH resource for a number of bits of the HARQ-ACK not more than a predetermined value, and the transmitting circuitry determines a second PUCCH resource based on the TPC and the fourth information, and transmits the HARQ-ACK using the second PUCCH resource for the number of bits of the HARQ-ACK more than the predetermined value, and b) in a case that the RRC message includes the second information, the transmitting circuitry is configured to perform the second behavior in which:

the transmitting circuitry determines the second PUCCH resource based on the TPC and the fourth information, and transmits the HARQ-ACK using the second PUCCH resource without using the first PUCCH resource.

2. The terminal device according to claim 1, wherein the HARQ-ACK includes information indicating a positive acknowledgment or a negative acknowledgment.

3. A first base station device which communicates with a terminal device using a first serving cell group (CG), the terminal device communicating with a second base station device using a second serving CG, each of the first serving CG and the second serving CG includes a physical uplink control channel (PUCCH) serving cell and at least one non-PUCCH serving cell, the PUCCH serving cell is a serving cell used for a PUCCH, the non-PUCCH serving cell is a serving cell not used for the PUCCH, the first base station device comprising:

transmitting circuitry configured to transmit for the first serving CG:

a radio resource control (RRC) message including i) either one of first information or second information, and ii) at least one of third information and fourth information, the first information indicating a first behavior, the second information indicating a second behavior, the third information regarding a first PUCCH resource configuration, and the fourth information regarding a second PUCCH resource configuration, and a downlink control information (DCI) format for scheduling a physical downlink shared channel (PDSCH), the DCI format including a transmission power command (TPC) for the PUCCH; and receiving circuitry configured to receive, on the PUCCH for the first serving CG, hybrid automatic repeat request-acknowledgment (HARQ-ACK) for a PDSCH transmission on the non-PUCCH serving cell, the PDSCH transmission on the non-PUCCH serving cell being scheduled by using the DCI format, wherein a) in a case that the RRC message includes the first information, the receiving circuitry is configured to perform the first behavior in which:

the receiving circuitry determines a first PUCCH resource based on the TPC and the third information, and receives the HARQ-ACK using the first PUCCH resource for a number of bits of the HARQ-ACK not more than a predetermined value, and the receiving circuitry determines a second PUCCH resource based on the TPC and the fourth information, and receives the HARQ-ACK using the second PUCCH resource for the number of bits of the HARQ-ACK more than the predetermined value, and b) in a case that the RRC message includes the second information, the receiving circuitry is configured to perform the second behavior in which:

the receiving circuitry determines the second PUCCH resource based on the TPC and the fourth information, and receives the HARQ-ACK using the second PUCCH resource without using the first PUCCH resource.

4. The first base station device according to claim 3, wherein the HARQ-ACK includes information indicating a positive acknowledgment or a negative acknowledgment.

5. A communication method of a terminal device which communicates with a first base station device using a first serving cell group (CG) and with a second base station device using a second serving CG, each of the first serving CG and the second serving CG includes a physical uplink control channel (PUCCH) serving cell and at least one non-PUCCH serving cell, the PUCCH serving cell is a serving cell used for a PUCCH, the non-PUCCH serving cell is a serving cell not used for the PUCCH, the communication method comprising:

receiving, for each of the first serving CG and the second serving CG, a radio resource control (RRC) message including i) either one of first information or second information, and ii) at least one of third information and fourth information, the first information indicating a first behavior, the second information indicating a second behavior, the third information regarding a first PUCCH resource configuration, and the fourth information regarding a second PUCCH resource configuration, and a downlink control information (DCI) format for scheduling a physical downlink shared channel (PDSCH), the DCI format including a transmission power command (TPC) for the PUCCH; and transmitting, on the PUCCH for each of the first serving CG and the second serving CG, hybrid automatic repeat request-acknowledgment (HARQ-ACK) for a PDSCH transmission on the non-PUCCH serving cell, the PDSCH transmission on the non-PUCCH serving cell being indicated by a detection of a physical download control channel (PDCCH) for either one of the first behavior or the second behavior, wherein a) in a case of the RRC message including the first information, performing the first behavior comprising:

a step of determining a first PUCCH resource based on the TPC and the third information, and a step of transmitting the HARQ-ACK using the first PUCCH resource for a number of bits of the HARQ-ACK not more than a predetermined value, and a step of determining a second PUCCH resource based on the TPC and the fourth information, and a step of transmitting the HARQ-ACK using the second PUCCH resource for a number of bits of the HARQ-ACK more than the predetermined value, and b) in a case of the RRC message including the second information, performing the second behavior comprising:

a step of determining the second PUCCH resource based on the TPC and the fourth information, and a step of transmitting the HARQ-ACK using the second PUCCH resource without using the first PUCCH resource.

6. The communication method according to claim 5, wherein
the HARQ-ACK includes information indicating a positive acknowledgment or a negative acknowledgment.

7. A communication method of a first base station device which communicates with a terminal device using a first serving cell group (CG) and the terminal device communicating with a second base station device using a second serving CG,
each of the first serving CG and the second serving CG includes a physical uplink control channel (PUCCH) serving cell and at least one non-PUCCH serving cell,
the PUCCH serving cell is a serving cell used for a PUCCH,
the non-PUCCH serving cell is a serving cell not used for the PUCCH,
the communication method comprising:
transmitting, for the first serving CG,
a radio resource control (RRC) message including i) either one of first information or second information, and ii) at least one of third information and fourth information, the first information indicating a first behavior, the second information indicating a second behavior, the third information regarding a first PUCCH resource configuration, and the fourth information regarding a second PUCCH resource configuration, and
a downlink control information (DCI) format for scheduling a physical downlink shared channel (PDSCH), the DCI format including a transmission power command (TPC) for the PUCCH; and
receiving, on the PUCCH for the first serving CG, hybrid automatic repeat request-acknowledgment (HARQ-ACK) for a PDSCH transmission on the non-PUCCH serving cell, the PDSCH transmission on the non-PUCCH serving cell being scheduled by using the DCI format, wherein
a) in a case of the RRC message including the first information, performing the first behavior comprising:
a step of determining a first PUCCH resource based on the TPC and the third information, and a step of the receiving the HARQ-ACK using the first PUCCH resource for a number of bits of the HARQ-ACK not more than a predetermined value, and
a step of determining a second PUCCH resource based on the TPC and the fourth information, and a step of receiving the HARQ-ACK using the second PUCCH resource for a number of bits of the HARQ-ACK more than the predetermined value, and
b) in a case of the RRC message including the second information, performing the second behavior comprising:
a step of determining the second PUCCH resource based on the TPC and the fourth information, and a step of the receiving the HARQ-ACK using the second PUCCH resource without using the first PUCCH resource.

8. The communication method according to claim 7, wherein
the HARQ-ACK includes information indicating a positive acknowledgment or a negative acknowledgment.

* * * * *